(12) United States Patent
Shinoda et al.

(10) Patent No.: US 12,095,892 B2
(45) Date of Patent: Sep. 17, 2024

(54) SENSOR DEVICE, RECEPTION DEVICE, AND TRANSMISSION/RECEPTION SYSTEM

(71) Applicant: SONY SEMICONDUCTOR SOLUTIONS CORPORATION, Kanagawa (JP)

(72) Inventors: Ryota Shinoda, Kanagawa (JP); Takashi Masuda, Kanagawa (JP); Kumiko Mahara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/042,474

(22) PCT Filed: Jul. 16, 2021

(86) PCT No.: PCT/JP2021/026722
§ 371 (c)(1),
(2) Date: Feb. 22, 2023

(87) PCT Pub. No.: WO2022/049907
PCT Pub. Date: Mar. 10, 2022

(65) Prior Publication Data
US 2023/0336323 A1 Oct. 19, 2023

(30) Foreign Application Priority Data
Sep. 4, 2020 (JP) ................. 2020-149339

(51) Int. Cl.
*H04L 7/00* (2006.01)
*H04L 7/06* (2006.01)

(52) U.S. Cl.
CPC .......... *H04L 7/0012* (2013.01); *H04L 7/0087* (2013.01); *H04L 7/06* (2013.01)

(58) Field of Classification Search
CPC ..... H04L 7/06; H04L 7/0012; H04N 21/2401; H03K 23/00; H03K 23/44; H03K 3/011;
(Continued)

(56) References Cited

U.S. PATENT DOCUMENTS

| 2009/0257453 | A1* | 10/2009 | Yanagisawa | ............ | H03L 7/093 |
| | | | | | 370/480 |
| 2011/0043694 | A1* | 2/2011 | Izuno | ................. | H04N 21/4392 |
| | | | | | 348/E9.034 |

(Continued)

FOREIGN PATENT DOCUMENTS

| JP | 2001-230750 A | 8/2001 |
| JP | 2002-026884 A | 1/2002 |

(Continued)

OTHER PUBLICATIONS

International Search Report and Written Opinion of PCT Application No. PCT/JP2021/026722, issued on Oct. 19, 2021, 08 pages of ISRWO.

*Primary Examiner* — Khai Tran
(74) *Attorney, Agent, or Firm* — CHIP LAW GROUP

(57) ABSTRACT

Provided is a transmission/reception system that can implement miniaturization and a reduced number of wires for transmitting a signal between a sensor device and a reception device. The sensor device includes a data transmitting unit configured to transmit imaging data synchronized with a first clock signal to the reception device through a first signal transmission path, a clock signal transmitting unit configured to transmit a second clock signal with a lower frequency than the first clock signal to the reception device through a second signal transmission path, and a control signal communicating unit configured to communicate a control signal necessary for control of the first clock signal with the reception device through the second signal transmission path. The reception device includes a signal gener- (Continued)

ating unit configured to generate the control signal on the basis of a comparison result of a comparison between a reference clock signal and any one of the second clock signal based on the first clock signal and the second clock signal transmitted from the sensor device through the second signal transmission path, and a control signal communicating unit configured to communicate the control signal with the sensor device through the second signal transmission path.

20 Claims, 20 Drawing Sheets

(58) Field of Classification Search
CPC .... H03K 7/0992; H03K 7/1974; H03L 1/027; G06F 1/06
USPC ................................ 375/354, 373, 376, 355
See application file for complete search history.

(56) References Cited

U.S. PATENT DOCUMENTS

| | | | |
|---|---|---|---|
| 2018/0212611 A1* | 7/2018 | Shen | H03L 3/00 |
| 2020/0004990 A1* | 1/2020 | Kurd | G06F 1/06 |
| 2021/0320783 A1* | 10/2021 | Masuda | H04L 7/0012 |

FOREIGN PATENT DOCUMENTS

| | | |
|---|---|---|
| JP | 2019-193149 A | 10/2019 |
| WO | 2017/098871 A1 | 6/2017 |
| WO | 2020/070974 A1 | 4/2020 |

* cited by examiner

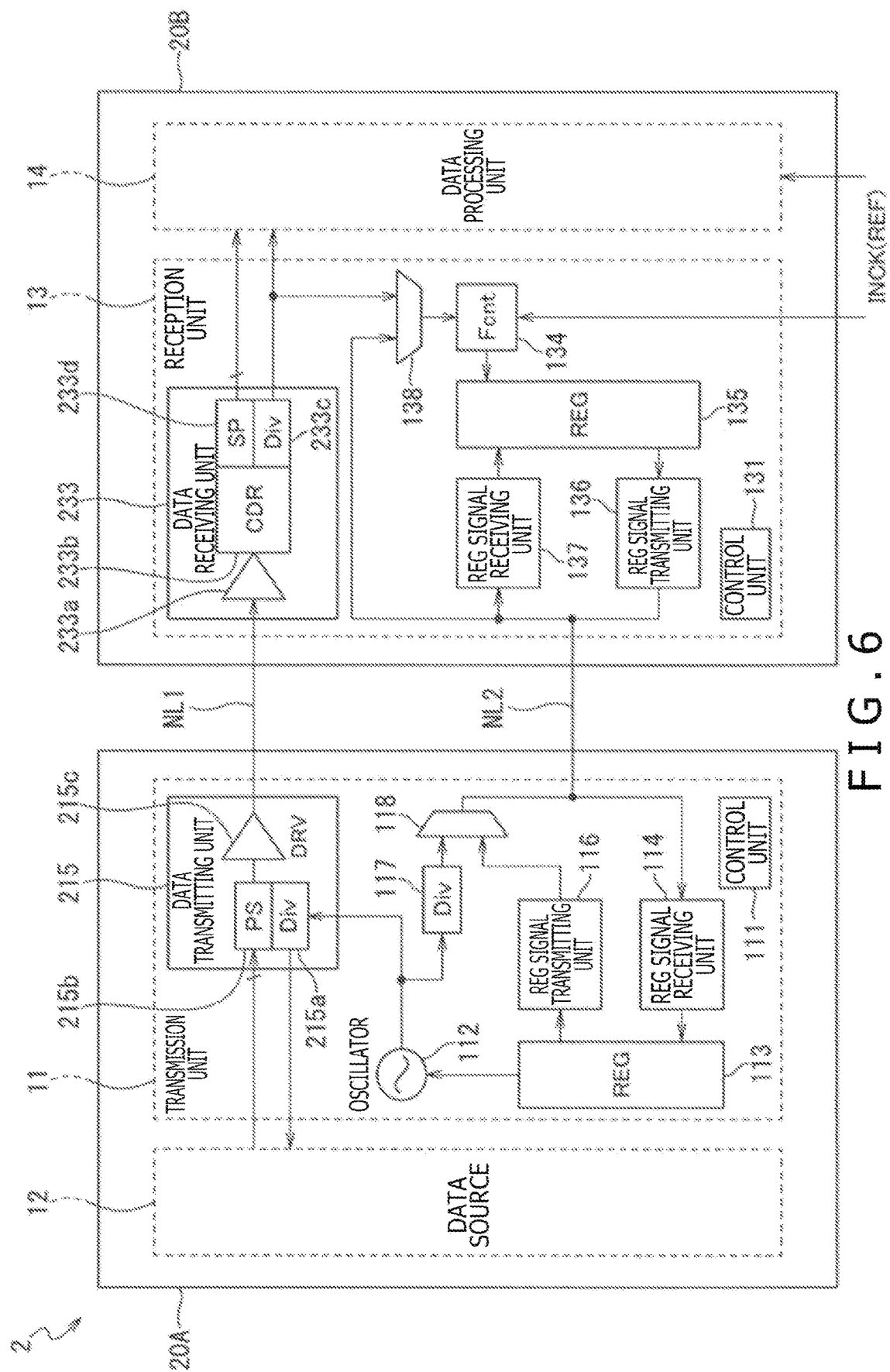
F I G. 6

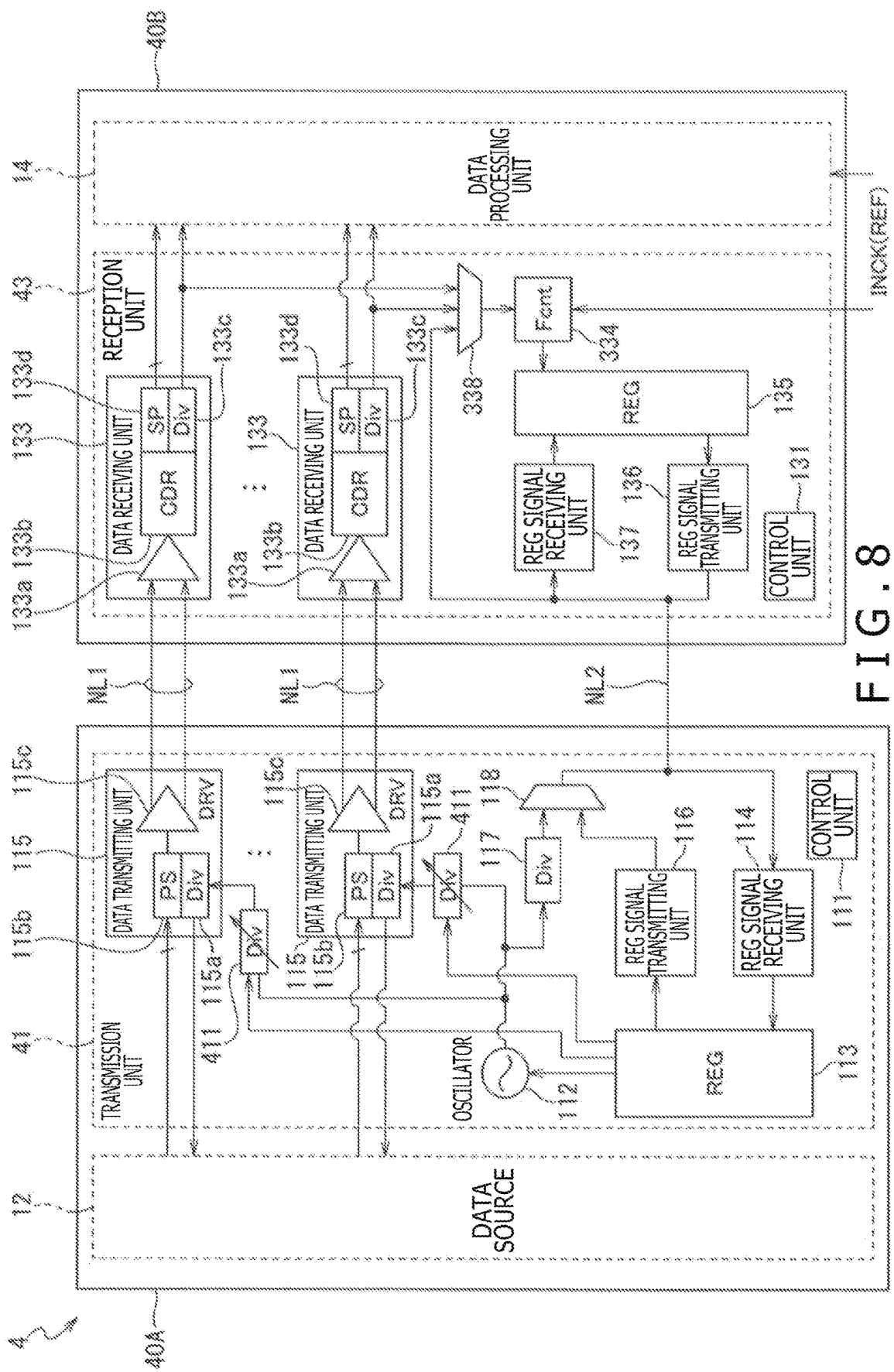
F I G . 8

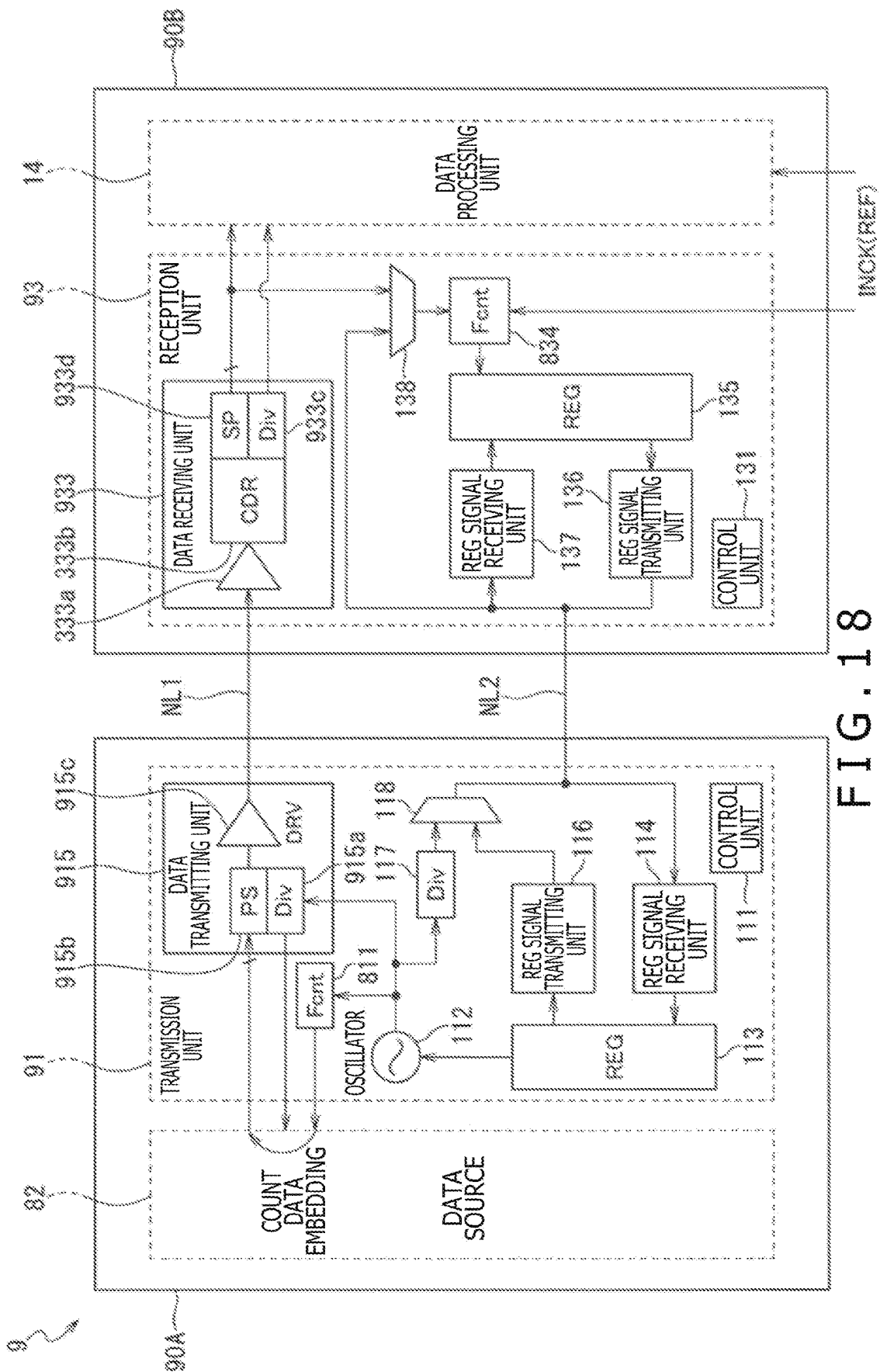
F I G. 18

SENSOR DEVICE, RECEPTION DEVICE, AND TRANSMISSION/RECEPTION SYSTEM

CROSS REFERENCE TO RELATED APPLICATIONS

This application is a U.S. National Phase of International Patent Application No. PCT/JP2021/026722 filed on Jul. 16, 2021, which claims priority benefit of Japanese Patent Application No. JP 2020-149339 filed in the Japan Patent Office on Sep. 4, 2020. Each of the above-referenced applications is hereby incorporated herein by reference in its entirety.

TECHNICAL FIELD

The present disclosure (present technology) relates to a sensor device, a reception device, and a transmission/reception system.

BACKGROUND ART

A transmitter has a reference clock signal and transmits a signal at a data rate that is a multiplication of that of the reference clock signal to a receiver. For example, an endoscope is configured such that a reference clock signal or a control signal is transmitted from a receiver to a transmitter. Further, with regard to stream transmitting devices that are stream transmitters as represented by broadcasting stations, a technology that adjusts a clock of an oscillator of a stream transmitting device from a receiver side has also been considered (for example, PTL 1).

CITATION LIST

Patent Literature

[PTL 1]
Japanese Patent Laid-open No. 2001-230750

SUMMARY

Technical Problem

However, as the number of signals that are transmitted and received between a transmitter and a receiver increases, the number of wires between the transmitter and the receiver increases. Moreover, as the number of wires between the transmitter and the receiver increases, the number of terminals of a semiconductor chip having formed thereon various functions of the transmitter increases. Hence, it is difficult to implement a miniaturized transmitter.

The present disclosure has been made in view of such a circumstance and has an object to provide a sensor device, a reception device, and a transmission/reception system that can implement miniaturization and a reduced number of wires for transmitting a signal between the sensor device and the reception device.

Solution to Problem

According to an aspect of the present disclosure, there is provided a sensor device including an oscillator configured to oscillate a first clock signal, a data transmitting unit configured to transmit imaging data synchronized with the first clock signal to an external device through a first signal transmission path, a clock signal transmitting unit configured to divide the first clock signal to generate a second clock signal with a lower frequency than the first clock signal and transmit the second clock signal to the external device through a second signal transmission path different from the first signal transmission path, and a control signal communicating unit configured to communicate a control signal necessary for control of the first clock signal with the external device through the second signal transmission path.

According to another aspect of the present disclosure, there is provided a reception device including a data receiving unit configured to receive imaging data transmitted from an external device through a first signal transmission path in synchronization with a first clock signal, a signal generating unit configured to generate a control signal necessary for control of the first clock signal, on the basis of a comparison result of a comparison between a reference clock signal and any one of a second clock signal based on the first clock signal and the second clock signal transmitted from the external device through a second signal transmission path, and a control signal communicating unit configured to communicate the control signal generated by the signal generating unit with the external device through the second signal transmission path.

According to still another aspect of the present disclosure, there is provided a transmission/reception system including a sensor device including an oscillator configured to oscillate a first clock signal and a data transmitting unit configured to transmit imaging data synchronized with the first clock signal, a reception device including a data receiving unit configured to receive the imaging data transmitted from the sensor device, a first signal transmission path connected between the sensor device and the reception device and configured to transmit the imaging data, and a second signal transmission path connected between the sensor device and the reception device and configured to transmit a signal other than the imaging data. The sensor device includes a clock signal transmitting unit configured to divide the first clock signal to generate a second clock signal with a lower frequency than the first clock signal and transmit the second clock signal to the reception device through the second signal transmission path, and a sensor-side control signal communicating unit configured to communicate a control signal necessary for control of the first clock signal with the reception device through the second signal transmission path. The reception device includes a signal generating unit configured to generate the control signal on the basis of a comparison result of a comparison between a reference clock signal and one of the second clock signal transmitted from the sensor device and the second clock signal based on the first clock signal, and a receiver-side control signal transmitting unit configured to communicate the control signal generated by the signal generating unit with the sensor device through the second signal transmission path.

BRIEF DESCRIPTION OF DRAWINGS

FIG. 6 is a functional block diagram illustrating schematic configurations of a sensor device, a reception device, and a transmission/reception system according to a second embodiment of the present technology.

FIG. 8 is a functional block diagram illustrating schematic configurations of a sensor device, a reception device, and a transmission/reception system according to a fourth embodiment of the present technology.

FIG. 18 is a functional block diagram illustrating schematic configurations of a sensor device, a reception device, and a transmission/reception system according to a ninth embodiment of the present technology.

DESCRIPTION OF EMBODIMENTS

Now, embodiments of the present disclosure are described with reference to the drawings. In the illustration of the drawings, which are referred to in the following description, the same or similar parts are denoted by the same or similar reference signs to omit the overlapping description.

Note that the effects described herein are merely exemplary and not limitative, and other effects may be provided.

First Embodiment

A sensor device, a reception device, and a transmission/reception system according to a first embodiment of the present technology are described. First, schematic configurations of the sensor device, the reception device, and the transmission/reception system according to the present embodiment are described by using FIG. 1.

Figure 1:
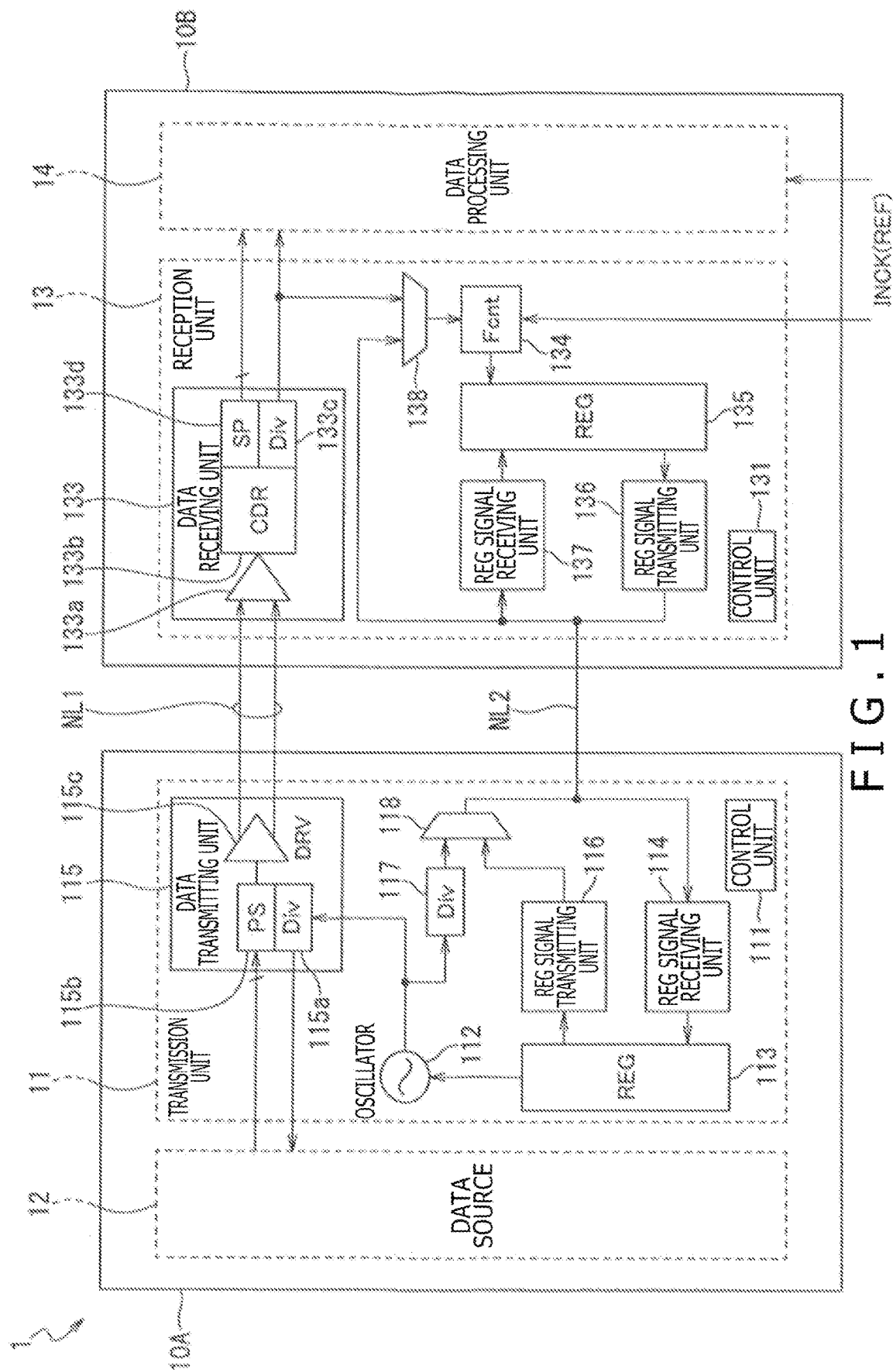
FIG. 1 is a functional block diagram illustrating schematic configurations of a sensor device, a reception device, and a transmission/reception system according to a first embodiment of the present technology.

As illustrated in FIG. 1, a transmission/reception system 1 according to the present embodiment includes a sensor device 10A configured to transmit predetermined imaging data and a reception device 10B configured to receive imaging data transmitted from the sensor device 10A. The transmission/reception system 1 is applicable to an endoscope system, for example, and configured such that the sensor device 10A captures imaging data and transmits the imaging data to the reception device 10B through a signal transmission path NL1. The reception device 10B processes the imaging data transmitted from the sensor device 10A and transmits the resultant to a display device (not illustrated), for example. Hence, the sensor device 10A is small in size enough to enter a narrow region such as inside a human body. Further, the reception device 10B can receive imaging data from the miniaturized sensor device 10A and control a clock signal for allowing the sensor device 10A to stably operate (as described in detail later).

The sensor device 10A according to the present embodiment includes a data source 12 configured to generate imaging data to be transmitted to the reception device 10B and a transmission unit 11 configured to transmit imaging data input from the data source 12 to the reception device 10B. In the present embodiment, the transmission unit 11 and the data source 12 are formed in different semiconductor chips to be stacked. Note that the transmission unit 11 and the data source 12 may be formed in the same semiconductor chip.

The data source 12 includes a solid-state image sensor (not illustrated), for example. The data source 12 outputs imaging data obtained by capturing an external environment in which the sensor device 10A is disposed to the transmission unit 11.

As illustrated in FIG. 1, the transmission unit 11 included in the sensor device 10A includes an oscillator 112 configured to oscillate a first clock signal CLK1, a register signal receiving unit (exemplary control signal communicating unit) 114 configured to receive a register signal (exemplary control signal) Rs transmitted from the reception device 10B through a signal transmission path NL2 to control the first clock signal CLK1, a register signal transmitting unit (exemplary control signal communicating unit) 116 configured to transmit the register signal Rs to the reception device 10B through the signal transmission path NL2, and a frequency divider (exemplary clock signal transmitting unit) 117 configured to divide the first clock signal CLK1 and transmit the resultant to the reception device 10B through the signal transmission path NL2. The reception device 10B corresponds to an exemplary external device with respect to the sensor device 10A. Note that, in FIG. 1 and the other figures, registers are represented as "REG." Further, in FIG. 1 and the other figures, frequency dividers are represented as "Div."

The oscillator 112 is configured such that an oscillation frequency can be changed. With this, the oscillator 112 can output the first clock signal CLK1 with a changed frequency. The oscillator 112 does not include a phase comparator, a loop filter, a voltage control oscillator, a frequency divider, and the like unlike a phase locked loop (PLL) Hence, the sensor device 10A can be smaller in size than a related-art sensor device including a PLL.

The transmission unit 11 includes a register 113 configured to store a setting value of the frequency of the first clock signal CLK1 that the oscillator 112 oscillates. The register 113 stores multiple setting values associated with the respective frequencies of the first clock signal CLK1. The register 113 reads the same setting value as a setting value included in the register signal Rs received by the register signal receiving unit 114 and outputs the setting value to the oscillator 112. The oscillator 112 sets the setting value input from the register 113 to a predetermined region. With this, the oscillator 112 oscillates the first clock signal CLK1 with a frequency corresponding to the setting value input from the register 113. The register 113 may store not only the setting values of the first clock signal CLK1 but also the setting values of each component provided in the sensor device 10A.

Further, when the reception device 10B reads another register value, the register 113 outputs the register value in question to the register signal transmitting unit 116 or outputs, to the register signal transmitting unit 116, a value for sending a response (an Ack or the like) to a signal for writing to the register 113. The register signal transmitting unit 116 transmits the register value or the value for sending a response (an Ack or the like) to a write signal to the reception device 10B through a switch 118 and the signal transmission path NL2.

When receiving the register signal Rs transmitted from the reception device 10B, the register signal receiving unit 114 writes the received register signal Rs to the register 113. The register signal Rs includes a frequency code. As described in detail later, a frequency code is a code that is determined by a signal generating unit 134 of the reception device 10B and that reflects whether the frequency of the first clock signal CLK1 is higher or lower than the frequency of a reference clock signal INCK.

The first clock signal CLK1 oscillated by the oscillator 112 is output to a data transmitting unit 115 and the frequency divider 117. The frequency divider 117 divides the input first clock signal CLK1 to generate a second clock signal CLK2 with a lower frequency than the first clock signal CLK1. The second clock signal CLK2 is output to one of input ends of the switch 118. Output from the register signal transmitting unit 116 is input to another input end of the switch 118. Then, the switch 118 outputs, according to a control instruction from a control unit 111, the second clock signal CLK2 and the output from the register signal transmitting unit 116 to the signal transmission path NL2 in an alternately switching manner in an initial calibration period from a boot of the sensor device 10A to a start of imaging data transmission.

The transmission unit 11 includes the data transmitting unit 115 configured to transmit data input from the data source 12 to the reception device 10B. The data transmitting unit 115 includes a frequency divider 115a configured to divide the first clock signal CLK1 input from the oscillator 112 to generate the second clock signal CLK2 with the lower frequency than the first clock signal CLK1. The frequency divider 115a outputs the second clock signal CLK2 to the data source 12.

Further, the data transmitting unit 115 includes a parallel-to-serial conversion unit 115b configured to convert parallel-format imaging data Dp input from the data source 12 in synchronization with the second clock signal CLK2 to serial-format imaging data Ds synchronized with the first clock signal CLK1. Note that, in FIG. 1 and the other figures, parallel-to-serial conversion units are represented as "PS." Moreover, the data transmitting unit 115 includes a driver 115c (exemplary transmission drive unit) configured to transmit the serial-format imaging data Ds synchronized with the first clock signal CLK1 to the reception device 10B through the signal transmission path NL1. For example, the driver 115c converts the single-end imaging data Ds input from the parallel-to-serial conversion unit 115b in synchronization with the first clock signal CLK1 to the differential imaging data Ds and converts the single-end first clock signal CLK1 to the differential first clock signal CLK1. The driver 115c embeds the first clock signal CLK1 in the imaging data Ds and transmits the resultant to the reception device 10B. With this, the imaging data Ds having embedded therein the high-frequency first clock signal CLK1 can be transmitted with low voltage. Further, the driver 115c can perform an input/output impedance conversion in a case where it has a configuration of a voltage follower, for example. Hence, the driver 115c has a reduced output impedance and thus can implement increased output current. With this, the sensor device 10A can prevent a malfunction due to a reduced signal level of the imaging data Ds output from the driver 115c (that is, a blunted signal waveform of the imaging data Ds) in the wires connecting the sensor device 10A to the reception device 10B.

The transmission unit 11 includes the control unit 111. The control unit 111 comprehensively controls the oscillator 112, the register 113, the register signal receiving unit 114, the data transmitting unit 115, the register signal transmitting unit 116, the frequency divider 117, and the switch 118. Note that the control unit 111 may also control the data source 12.

The reception device 10B according to the first embodiment includes a reception unit 13 configured to receive a predetermined signal transmitted from the sensor device 10A and a data processing unit 14 configured to perform predetermined processing on data received by the reception unit 13. In the first embodiment, the reception unit 13 and the data processing unit 14 are formed in different semiconductor chips to be stacked. Note that the reception unit 13 and the data processing unit 14 may be formed in the same semiconductor chip.

The reception unit 13 includes a data receiving unit 133 configured to receive the imaging data Ds transmitted from the sensor device 10A in synchronization with the first clock signal CLK1. The data receiving unit 133 includes a driver 133a configured to receive the imaging data Ds transmitted from the driver 115c provided in the data transmitting unit 115 of the sensor device 10A. The driver 133a amplifies the input imaging data Ds and outputs the resultant to a reproduction unit 133b on the subsequent stage. The reproduction unit 133b reproduces, from the imaging data Ds, the first clock signal CLK1 embedded in the imaging data Ds to be transmitted from the sensor device 10A. The reproduction unit 133b exhibits a clock data recovery (CDR) function, for example. Note that, in FIG. 1 and the other figures, reproduction units configured to exhibit the CDR function are represented as "CDR."

Further, the driver 133a converts the differential imaging data Ds input from the driver 115c to the single-end imaging data Ds and outputs the single-end imaging data Ds to the reproduction unit 133b on the subsequent stage. Note that the differential imaging data Ds input from the driver 115c may be output to the reproduction unit 133b as differential imaging data.

The data receiving unit 133 includes a frequency divider 133c configured to divide the frequency of the first clock signal CLK1 input from the sensor device 10A to generate the second clock signal CLK2 with the lower frequency than the first clock signal CLK1. The frequency divider 133c has the same configuration as the frequency divider 115a provided in the data transmitting unit 115 of the sensor device 10A. The frequency divider 133c divides the first clock signal CLK1 to generate the second clock signal CLK2 with the same frequency as the second clock signal CLK2 generated by the frequency divider 115a.

The data receiving unit 133 includes a serial-to-parallel conversion unit 133d configured to convert the serial-format imaging data Ds input from the sensor device 10A in synchronization with the first clock signal CLK1 to the parallel-format imaging data Dp synchronized with the second clock signal CLK2. Note that, in FIG. 1 and the other figures, serial-to-parallel conversion units are represented as "SP." The serial-to-parallel conversion unit 133d converts the imaging data Ds to the parallel-format imaging data Dp in synchronization with the second clock signal CLK2 generated by the frequency divider 133c.

The data receiving unit 133 outputs the second clock signal CLK2 from the frequency divider 133c and the parallel-format imaging data Dp to the data processing unit 14. With this, the data receiving unit 133 can output the second clock signal CLK2 generated by the frequency divider 133c and the imaging data Dp that is output from the serial-to-parallel conversion unit 133d and is synchronized with the second clock signal CLK2 in question to the data processing unit 14.

In this way, the imaging data Dp that is output from the data receiving unit 133 is a signal synchronized with the second clock signal CLK2 generated by the frequency divider 133c. Further, the imaging data Dp that is input to the data transmitting unit 115 is a signal synchronized with the second clock signal CLK2 generated by the frequency divider 115a. However, the second clock signal CLK2 generated by the frequency divider 115a of the data transmitting unit 115 and the second clock signal CLK2 generated by the frequency divider 133c of the data receiving unit 133 are different from each other in phase and do not have the same timing in a rigorous manner. In the first embodiment, the second clock signal CLK2 generated by the frequency divider 115a and the second clock signal CLK2 generated by the frequency divider 133c are signals with the same frequency, but the second clock signals CLK2 can be signals with different frequencies.

For example, assume that the data transmitting unit 115 of the transmission unit 11 converts the imaging data Dp input at a communication speed of 50 Mbps/20 bits (the frequency of the second clock signal CLK2 generated by the frequency divider 115a is 50 MHz) to the data Ds at a communication speed of 1 Gbps/1 bit. In this case, the data receiving unit 133 of the reception unit 13 may convert the imaging data Ds input at a communication speed of 1 Gbps/1 bit to the imaging data Dp at a communication speed of 100 Mbps/10 bits (the frequency of the second clock signal CLK2 generated by the frequency divider 133c is 100 MHz).

The reception unit 13 includes the signal generating unit 134 configured to generate the register signal (exemplary control signal) Rs for controlling the first clock signal CLK1, on the basis of the comparison result of a comparison between one of the second clock signal CLK2 transmitted from the sensor device 10A and the second clock signal CLK2 based on the first clock signal CLK1 and the reference clock signal INCK. Here, the second clock signal CLK2 is a signal generated by dividing the first clock signal CLK1 and hence corresponds to a signal based on the first clock signal CLK1. Note that, in FIG. 1 and the other figures, signal generating units are represented as "Fcnt."

Further, the reception unit 13 includes a register 135 configured to store the register signal Rs generated by the signal generating unit 134, a register signal transmitting unit (exemplary control signal communicating unit) 136 configured to transmit the register signal Rs stored in the register 135 to the sensor device 10A through the signal transmission path NL2, and a register signal receiving unit (exemplary control signal communicating unit) 137 configured to receive an Ack or the like that is transmitted from the sensor device 10A through the signal transmission path NL2 at the time of register reading from the register 113 or writing to the register 113 and store the Ack or the like in the register 135.

Moreover, the reception unit 13 includes a switch 138 provided between the frequency divider 133c and the signal generating unit 134. To one of input ends of the switch 138, the second clock signal CLK2 transmitted from the sensor device 10A through the signal transmission path NL2 is input. To another input end of the switch 138, the second clock signal CLK2 output from the frequency divider 133c is input. Then, the switch 138 selectively outputs, according to a control instruction from a control unit 131, the second clock signal CLK2 transmitted from the sensor device 10A and the second clock signal CLK2 output from the frequency divider 133c to the signal generating unit 134.

The signal generating unit 134 receives the second clock signal CLK2 output from the switch 138 and the reference clock signal INCK input from the outside of the reception device 10B. The signal generating unit 134 continues to sequentially compare the frequencies of the input second clock signal CLK2 with the input reference clock signal INCK. The signal generating unit 134 includes, for example, a counter configured to operate with the second clock signal CLK2 and a counter configured to operate with the reference clock signal INCK. The signal generating unit 134 compares count values obtained by counting by the respective counters in a predetermined period of time with each other to acquire a frequency difference between the second clock signal CLK2 and the reference clock signal INCK. The signal generating unit 134 outputs the register signal Rs to the register 135 when the second clock signal CLK2 and the reference clock signal INCK have a frequency difference outside a predetermined error range. The register signal Rs includes a frequency code reflecting whether the frequency of the first clock signal CLK1 output from the oscillator 112 is higher or lower than the frequency of the reference clock signal INCK.

The register signal transmitting unit 136 reads the register signal Rs stored in the register 135 and outputs the register signal Rs to the register signal receiving unit 114 through the signal transmission path NL2.

The reception unit 13 includes the control unit 131. The control unit 131 comprehensively controls the data receiving unit 133, the signal generating unit 134, the register signal transmitting unit 136, the register signal receiving unit 137, and the switch 138.

The data processing unit 14 included in the reception device 10B executes predetermined processing by using the imaging data Dp and the second clock signal CLK2 input from the data receiving unit 133 and the reference clock signal INCK input from the outside of the reception device 10B. For example, the data processing unit 14 executes, to display an image taken by the data source 12 on a display device (not illustrated), sorting processing or correction processing of the imaging data Dp.

Figure 2:
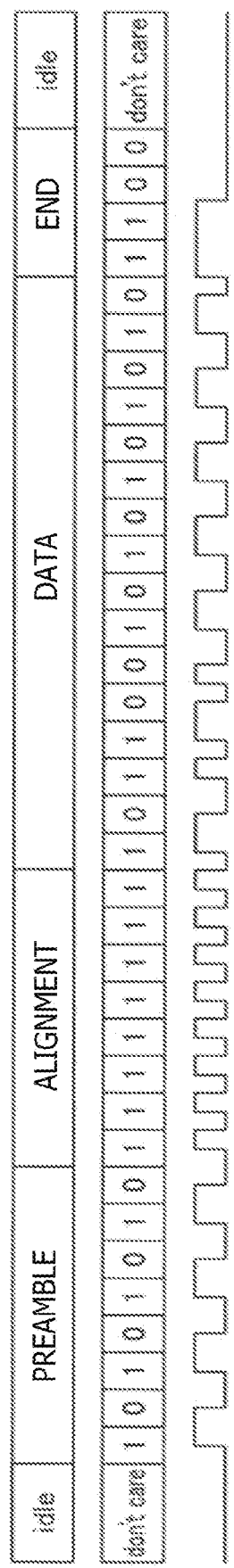
FIG. 2 is a diagram illustrating an exemplary format of data that is transmitted and received by the sensor device, the reception device, and the transmission/reception system according to the first embodiment of the present technology.

Next, an exemplary data signal data format of the register signal Rs that is transmitted and received between the sensor device 10A and the reception device 10B is described by using FIG. 2. As the data format, for example, Manchester coding may be used.

As illustrated in FIG. 2, the data format includes four portions of preamble, alignment, data, and end portions. The preamble portion has embedded therein a clock signal. Hence, the preamble portion is oversampled with a high-frequency clock signal to obtain the period of the register signal Rs to be transmitted. With this, the sensor device 10A can recognize the transmission period of the register signal Rs. In the alignment portion, bit synchronization is performed with the period obtained in the preamble portion. In the first embodiment, for example, a signal only having "1" is set in the alignment portion. With this, the sensor device 10A can perform synchronization with the transmission period by using the clock signal that is sent by the oscillator 112 and is higher in frequency than the register signal Rs.

In the data portion, the register signal Rs that is transmitted from the reception device 10B to the sensor device 10A is set. In the data portion, the register signal Rs is set in accordance with predetermined rules. With this, the sensor device 10A can acquire information regarding the register signal Rs set in the data portion and recognize contents of the information. In the end portion, information indicating that the transmission of the register signal Rs in the period in question has ended is set. With this, the sensor device 10A can recognize that the data signal transmission in the period in question has ended.

In the source-synchronous scheme, a data signal and a clock signal are transmitted and received in parallel between the sensor device 10A and the reception device 10B. Hence, a data format for transmitting the register signal Rs is not necessarily provided with a preamble portion. In this case, bit alignment is performed as phase adjustment on the reception device 10B side.

Further, in the source-synchronous scheme, a register address, register contents, writing, reading, parity, an ACK, a NACK, or the like may be combined in a data portion to be sent.

Comparative Example

Figure 3:
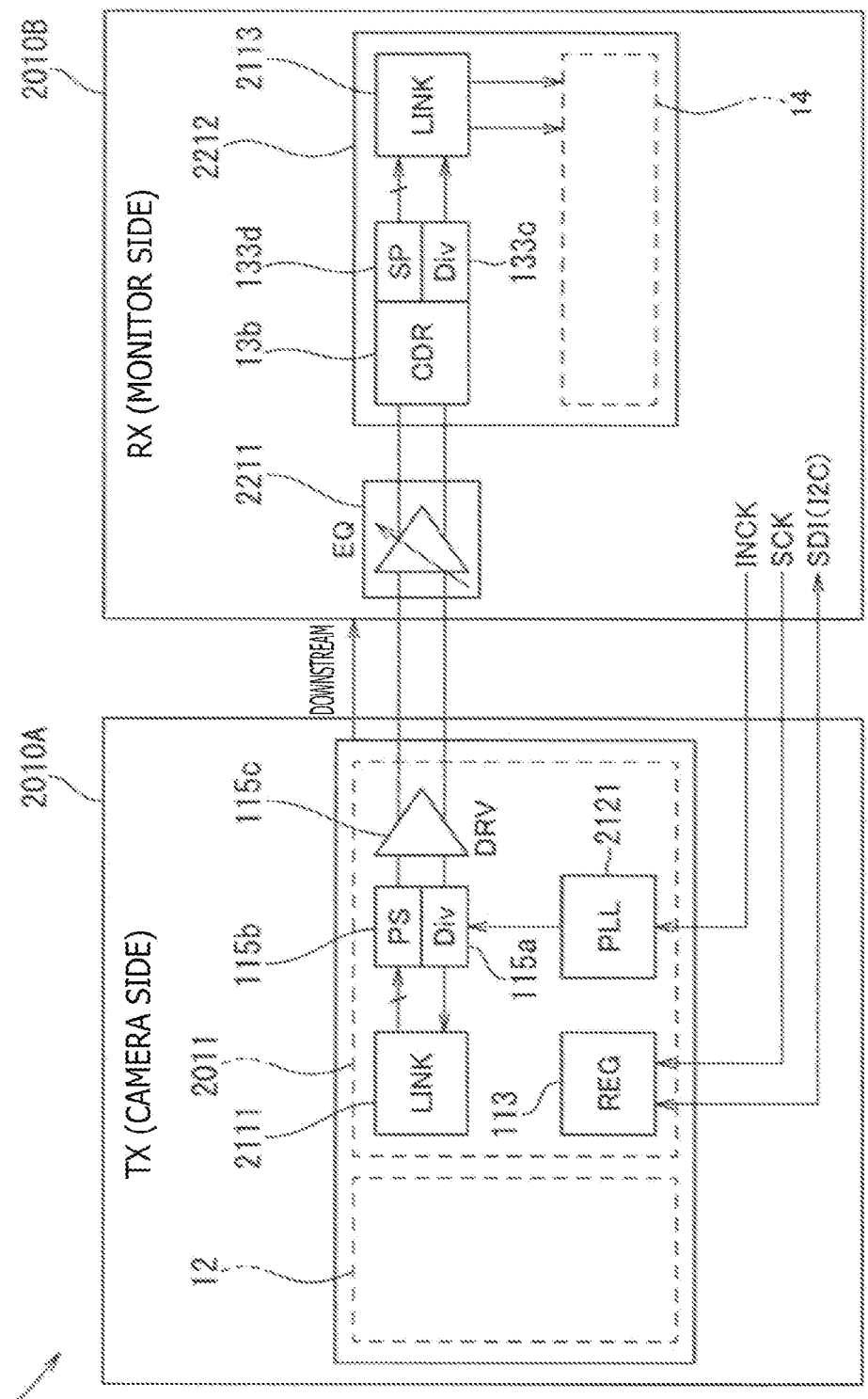
FIG. 3 is a functional block diagram illustrating schematic configurations of a sensor device, a reception device, and a transmission/reception system according to a comparative example.

FIG. 3 is a block diagram illustrating a transmission/reception system according to a comparative example. In FIG. 3, the same parts as those of FIG. 1 described above are denoted by the same reference signs to omit the detailed description thereof.

A transmission/reception system 2000 illustrated in FIG. 3 includes a sensor device 2010A configured to transmit predetermined imaging data and a reception device 2010B configured to receive imaging data transmitted from the sensor device 2010A.

A transmission unit 2011 of the sensor device 2010A includes a link unit 2111 and a PLL circuit 2121. The PLL circuit 2121 includes a phase comparator, a loop filter, a voltage control oscillator, and the like and outputs a first clock signal synchronized with the separately provided reference clock INCK to the frequency divider 115a. The link unit 2111 outputs a second clock signal with a lower frequency than a first clock signal output from the frequency divider 115a to the data source 12. Further, the link unit 2111 performs predetermined processing on data input from the data source 12 in synchronization with a second clock signal and outputs the parallel-format imaging data Dp to the parallel-to-serial conversion unit 115b in synchronization with the second clock signal.

The reception device 2010B includes an equalizer 2211 and a reception unit 2212. The equalizer 2211 is a circuit configured to compensate for, in a case where the signal level of the imaging data Ds output from the driver 115c is reduced in wires connecting the sensor device 2010A to the reception device 2010B, the reduced signal level. Moreover, the reception unit 2212 includes a link unit 2213. The link unit 2213 converts, in synchronization with a second clock signal output from the frequency divider 133c, the imaging data Dp output from the serial-to-parallel conversion unit 133d to a data format processable by the data processing unit 14.

Incidentally, in the comparative example, as compared with the first embodiment, the number of signals between the sensor device 2010A and the reception device 2010B is large, so that there are problems in that the number of signals to be taken care of is large (in the example of FIG. 3, a serial clock signal SCK, the reference clock signal INCK, and an SDI (Serial Digital Interface) signal) and that the number of pins that the sensor device 2010A requires to receive signals is large, for example.

<Operation of Transmission/Reception System According to First Embodiment> Next, control processing of a clock signal frequency by the sensor device 10A, the reception device 10B, and the transmission/reception system 1 according to the first embodiment is described by using FIGS. 4A, 4B, 4C, 4D, and with reference also to FIG. 1. FIGS. 4A, 4B, 4C, and 4D are timing charts illustrating communication operation between the sensor device 20A and the reception device 20B that is executed during and after a boot of the transmission/reception system 1. FIG. 5 is a flowchart illustrating the control processing of a clock signal frequency that is executed during and after the boot of the transmission/reception system 1. In the first embodiment, to facilitate the understanding, the processing flow of the transmission/reception system 1 is divided into processing during boot (initial calibration) and processing in operation after boot (normal operation).

Figure 4:
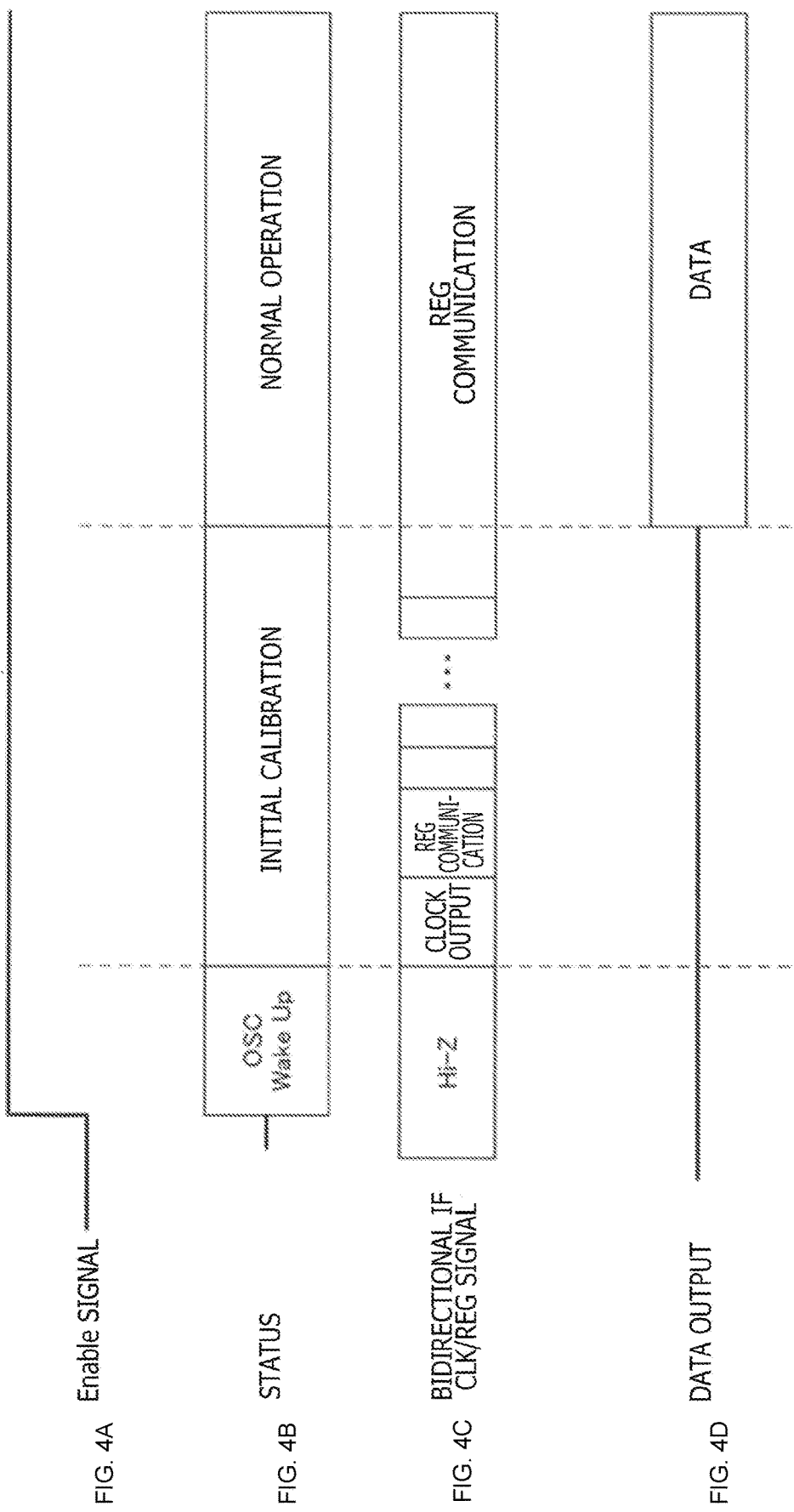
FIGS. 4A, 4B, 4C, and 4D are timing charts illustrating communication operation between the sensor device and the reception device that is executed during and after a boot of the transmission/reception system according to the first embodiment of the present technology.
Figure 5:
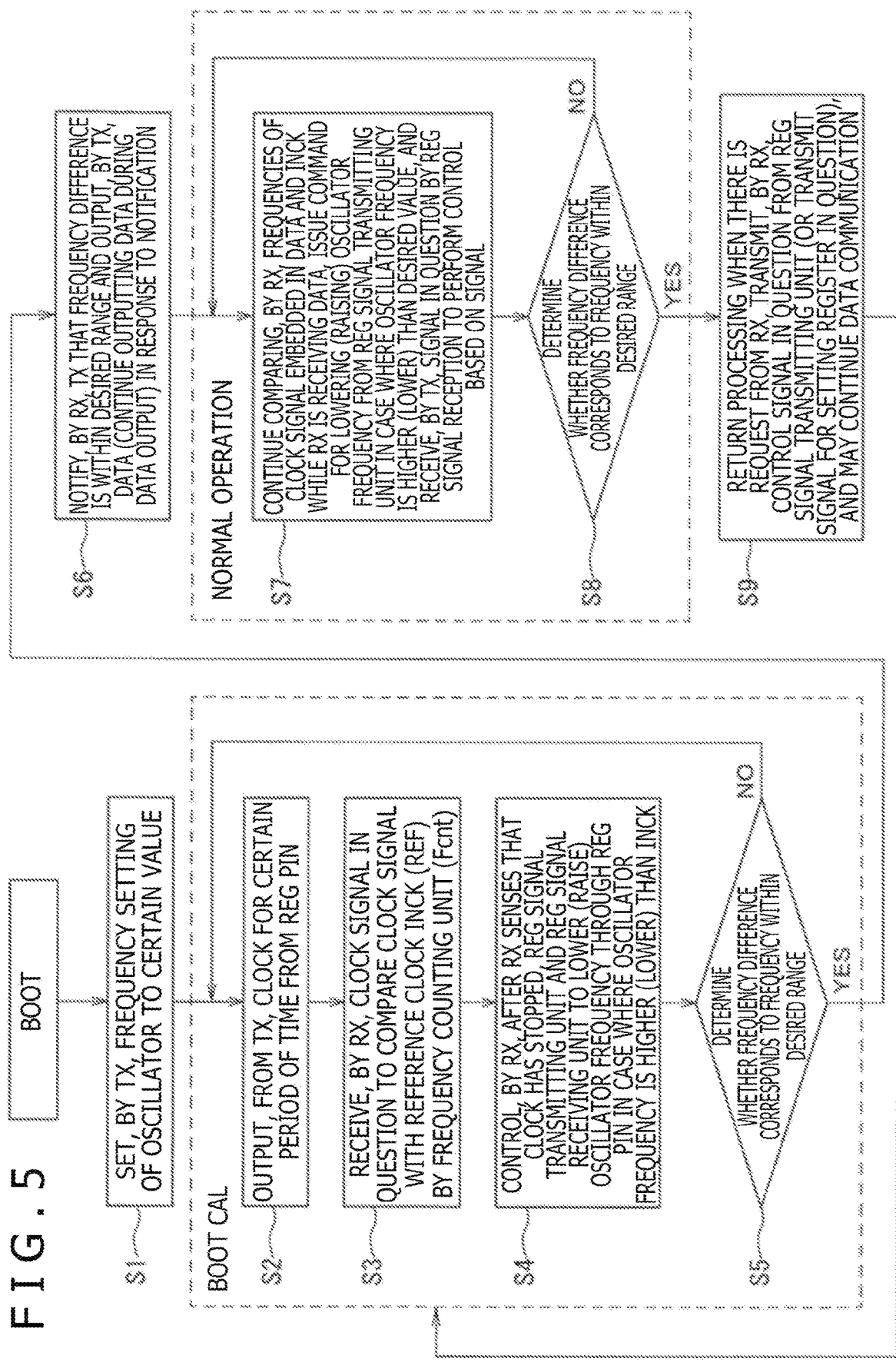
FIG. 5 is a flowchart illustrating control processing of a clock signal frequency that is executed during and after the boot of the transmission/reception system according to the first embodiment of the present technology.

In the transmission/reception system 1 according to the first embodiment, first, when the sensor device 10A and the reception device 10B are powered on, an enable signal illustrated in FIG. 4A changes from low to high, and processing during boot starts (OSC Wake up illustrated in FIG. 4B).

(Step S1 of FIG. 5)

As illustrated in FIG. 5, in Step S1, the sensor device 10A waits until a certain period of time has elapsed from the boot and sets the frequency of the first clock signal CLK1 to a predetermined value, and the processing proceeds to Step S2. The control unit 111 of the sensor device 10A sets, to the setting value of the oscillator 112, an initial value (for example, a setting value) of the frequency of the first clock signal CLK1 as a predetermined value.

(Step S2 of FIG. 5) In initial calibration illustrated in FIG. 4B, the sensor device 10A divides the first clock signal CLK1 with the frequency having the predetermined value set in Step S1 to obtain the second clock signal CLK2 and transmits the second clock signal CLK2 to the reception device 10B through the signal transmission path NL2. At this time, the control unit 111 controls the frequency divider 117 and the switch 118 to transmit the second clock signal CLK2 (clock output illustrated in FIG. 4C) to the reception device 10B through the signal transmission path NL2.

(Step S3 of FIG. 5)

Following Step S2, the transmission/reception system 1 executes the control processing of the second clock signal CLK2 transmitted from the sensor device 10A to the reception device 10B. In the control processing of the second clock signal CLK2, first, the reception device 10B executes clock signal comparison processing of comparing the second clock signal CLK2 transmitted from the sensor device 10A with the reference clock signal INCK. In the clock signal comparison processing, the signal generating unit 134 acquires, under the control of the control unit 131, a difference between the frequency of the second clock signal CLK2 transmitted from the sensor device 10A and the frequency of the reference clock signal INCK input from the outside of the reception device 10B.

(Step S4 of FIG. 5)

Before the clock signal comparison processing is executed, in the sensor device 10A, the control unit 111 transmits the second clock signal CLK2 a specified number of times to the reception device 10B and then stops the oscillator 112.

In the reception device 10B, the control unit 131 receives the second clock signal CLK2 the specified number of times from the sensor device 10A to sense that the oscillator 112 has stopped, and then controls, on the basis of the difference between the frequency of the second clock signal CLK2 and the frequency of the reference clock signal INCK, which has been acquired by the signal generating unit 134, the register signal transmitting unit 136 and the register signal receiving unit 137 to transmit the register signal Rs to the sensor device 10A, thereby changing the setting value of the oscillator 112 (initial calibration illustrated in FIG. 4B and REG communication illustrated in FIG. 4C).

(Step S5 of FIG. 5)

Assume that the frequency difference between the second clock signal CLK2 and the reference clock signal INCK is larger than the maximum frequency resolution settable to the oscillator 112. In this case, the control unit 131 determines that the frequency of the second clock signal CLK2 transmitted from the sensor device 10A does not have an optimum value (NO)). With this, the reception device 10B transmits the register signal Rs to the sensor device 10A. The signal generating unit 134 includes a frequency code (NC) indicating that the frequency of the first clock signal CLK1 does not have an optimum value in the register signal Rs, and the processing returns to Step S2 described above. The transmission/reception system 1 repeats the processing until the second clock signal CLK2 and the reference clock signal INCK that have had a frequency difference outside a predetermined error range have a frequency difference within the predetermined error range and the frequency of the first clock signal CLK1 has an optimum value. The transmission/ reception system 1 returns from Step S5 to Step S2 and then executes the processing in Step S2 to Step S5.

Meanwhile, assume that the frequencies of the second clock signal CLK2 and the reference clock signal INCK are identical as a result of the clock signal comparison processing by the signal generating unit 134, or that the frequency difference between the second clock signal CLK2 and the reference clock signal INCK, which has been obtained by the signal generating unit 134, is smaller than the maximum frequency resolution settable to the oscillator 112. In this case, the control unit 131 determines that the frequency of the first clock signal CLK1 transmitted from the sensor device 10A has an optimum value (YES).

(Step S6 of FIG. 5) When it is determined that the frequency of the first clock signal CLK1 transmitted from the sensor device 10A has an optimum value, the signal generating unit 134 includes a frequency code (OK) indicating that the frequency of the first clock signal CLK1 has an optimum value in the register signal Rs. The control unit 131 controls the register signal transmitting unit 136 to transmit the register signal Rs to the sensor device 10A.

In the sensor device 10A, the control unit 111 controls the register signal receiving unit 114 to receive the register signal Rs transmitted from the reception device 10B and makes, in a case where the frequency code (OK) is included, the sensor device 10A enter a state where boot processing (initial calibration illustrated in FIG. 4B) has been complete. With this, the processing during the boot of the sensor device 10A and the reception device 10B ends, and the sensor device 10A starts the normal operation processing (normal operation illustrated in FIG. 4B).

(Step S7 of FIG. 5)

The sensor device 10A changes the parallel-format imaging data Dp to the serial-format imaging data Ds and embeds the first clock signal CLK1 in the imaging data Ds to generate a clock-embedded signal EB. The parallel-to-serial conversion unit 115b of the data transmitting unit 115 outputs, under the control of the control unit 111, the imaging data Ds synchronized with the first clock signal CLK1 input from the oscillator 112 to the driver 115c. The driver 115c embeds the imaging data Ds input from the parallel-to-serial conversion unit 115b and the first clock signal CLK1 input from the oscillator 112 in the differential imaging data Ds. In this way, the driver 115c generates the clock-embedded signal EB.

The sensor device 10A outputs the clock-embedded signal EB (the data illustrated in FIG. 4D) to the reception device 10B through the signal transmission path NL1. The data transmitting unit 115 transmits, under the control of the control unit 111, the clock-embedded signal EB generated by the driver 115c to the reception device 10B.

The reception device 10B reproduces the first clock signal CLK1 from the clock-embedded signal EB transmitted from the sensor device 10A and converts the serial-format imaging data Ds to the parallel-format imaging data Dp. The data receiving unit 133 of the reception device 10B reproduces, under the control of the control unit 131, the first clock signal CLK1 from the clock-embedded signal EB transmitted from the sensor device 10A, by the reproduction unit 133b. Further, the data receiving unit 133 divides, under the control of the control unit 131, the first clock signal CLK1 reproduced from the clock-embedded signal EB, by the frequency divider 133c, to generate the second clock signal CLK2. Moreover, under the control of the control unit 131, the data receiving unit 133 outputs the imaging data Dp synchronized with the second clock signal CLK2 to the data processing unit 14 and outputs the second clock signal CLK2 to the signal generating unit 134 through the switch 138.

In the reception device 10B, the control unit 131 controls, on the basis of the difference between the frequency of the second clock signal CLK2 and the frequency of the reference clock signal INCK, which has been acquired by the signal generating unit 134, the register signal transmitting unit 136 and the register signal receiving unit 137 to transmit the register signal Rs to the sensor device 10A, thereby changing the setting value of the oscillator 112.
(Step S8 of FIG. 5)

Assume that the frequency difference between the second clock signal CLK2 and the reference clock signal INCK does not correspond to a frequency within a desired range. In this case, the control unit 131 determines that the frequency of the second clock signal CLK2 transmitted from the sensor device 10A does not have an optimum value (NO)). With this, the reception device 10B transmits the register signal Rs to the sensor device 10A. The signal generating unit 134 includes a frequency code (NG) indicating that the frequency of the first clock signal CLK1 does not have an optimum value in the register signal Rs, and the processing returns to Step S7 described above. The transmission/reception system 1 repeats the processing until the second clock signal CLK2 and the reference clock signal INCK that have had a frequency difference outside a predetermined error range have a frequency difference within the predetermined error range and the frequency of the first clock signal CLK1 has an optimum value. The transmission/reception system 1 returns from Step S8 to Step S7 and then executes normal operation or clock signal control operation depending on the frequency of the first clock signal CLK1.

Meanwhile, assume that the frequencies of the second clock signal CLK2 and the reference clock signal INCK are identical as a result of the clock signal comparison processing by the signal generating unit 134, or that the frequency difference between the second clock signal CLK2 and the reference clock signal INCK, which has been obtained by the signal generating unit 134, is smaller than the maximum frequency resolution settable to the oscillator 112. In this case, the control unit 131 determines that the frequency of the first clock signal CLK1 transmitted from the sensor device 10A has an optimum value (YES).
(Step S9 of FIG. 5)

When it is determined that the frequency of the first clock signal CLK1 transmitted from the sensor device 10A has an optimum value, the signal generating unit 134 includes a frequency code (OK) indicating that the frequency of the first clock signal CLK1 has an optimum value in the register signal Rs. The control unit 131 controls the register signal transmitting unit 136 to transmit the register signal Rs to the sensor device 10A.

In the sensor device 10A, the control unit 111 receives the register signal Rs transmitted from the reception device 10B and maintains data communication in a case where the frequency code (OK) is included.

Note that the signal generating unit 134 includes, in a case where the frequency difference between the second clock signal CLK2 and the reference clock signal INCK has a certain frequency value or larger, initialization information indicating returning of the processing to initial calibration in the register signal Rs. The control unit 131 controls the register signal transmitting unit 136 to transmit the register signal Rs to the sensor device 10A.

In the sensor device 10A, the control unit 111 receives the register signal Rs transmitted from the reception device 10B and makes, in a case where the initialization information is included, the sensor device 10A enter a state for executing initial calibration. With this, the sensor device 10A starts initial calibration to reconstruct the transmission/reception system 1.

Actions and Effects According to First Embodiment

As described above, according to the first embodiment, in terms of the control of the frequency of the first clock signal CLK1, the signal transmission path NL2 connecting the sensor device 10A to the reception device 10B can be used for the transmission of the second clock signal CLK2 output from the frequency divider 117 and the communication of the register signal Rs, so that a simplified wiring structure between the sensor device 10A and the reception device 10B can be implemented.

Further, according to the first embodiment described above, in the sensor device 10A, the switch 118 configured to output the second clock signal CLK2 output from the frequency divider 117 and the register signal Rs output from the register signal transmitting unit 116 to the reception device 10B through the signal transmission path NL2 in a selectively switching manner is included, so that a pin (terminal) for register signal communication can also be used as a pin (terminal) for second clock signal transmission, with the result that a reduced number of pins (number of terminals) of the sensor device 10A can be implemented, leading to the miniaturized sensor device 10A.

Moreover, according to the first embodiment described above, in a case where the frequency of the first clock signal CLK1 in the sensor device 10A and the frequency of the reference clock signal INCK in the reception device 10B are far from each other, since the reproduction unit 133b of the reception device 10B cannot lock the first clock signal CLK1 sent from the sensor device 10A, the initial calibration of the first clock signal CLK1 is executed by using the signal transmission path NL2 in a period from the boot to the start of the transmission of the imaging data Ds to the reception device, thereby enabling a reduction in difference between the frequency of the first clock signal CLK1 in the sensor device 10A and the frequency of the reference clock signal INCK in the reception device 10B before the start of the transmission of the imaging data Ds. Further, after the transmission of the imaging data Ds to the reception device 10B has started, the signal transmission path NL2 can be used only for the communication of the register signal Rs.

Second Embodiment

A sensor device, a reception device, and a transmission/reception system according to a second embodiment of the present technology are described by using FIG. 6. Note that components having the same actions and functions as the sensor device, the reception device, and the transmission/reception system according to the first embodiment described above are denoted by the same reference signs to omit the description.

As illustrated in FIG. 6, a transmission/reception system 2 according to the second embodiment includes a sensor device 20A configured to transmit a predetermined signal and a reception device 20B configured to receive a predetermined signal transmitted from the sensor device 20A.

The transmission unit 11 of the sensor device 20A includes a data transmitting unit 215. The data transmitting unit 215 includes a frequency divider 215a configured to receive the first clock signal CLK1, a parallel-to-serial conversion unit 215b, and a driver 215c. The driver 215c of the data transmitting unit 215 outputs, for example, the single-end imaging data Ds input from the parallel-to-serial conversion unit 215b in synchronization with the first clock signal CLK1, to the signal transmission path NL1 as single-end imaging data.

The reception unit 13 of the reception device 20B includes a data receiving unit 233. The data receiving unit 233 includes a driver 233a, a reproduction unit 233b, a frequency divider 233c, and a serial-to-parallel conversion unit 233d. The driver 233a of the data receiving unit 233 outputs the single-end imaging data Ds input from the driver 215c of the sensor device 20A, to the reproduction unit 233b on the subsequent stage.

Actions and Effects According to Second Embodiment

According to the second embodiment, actions and effects similar to those of the first embodiment described above are obtained, and a reduced number of pins (number of terminals) used for input and output or the like of the transmission unit 11 and the reception unit 13 can be implemented.

Third Embodiment

Figure 7:
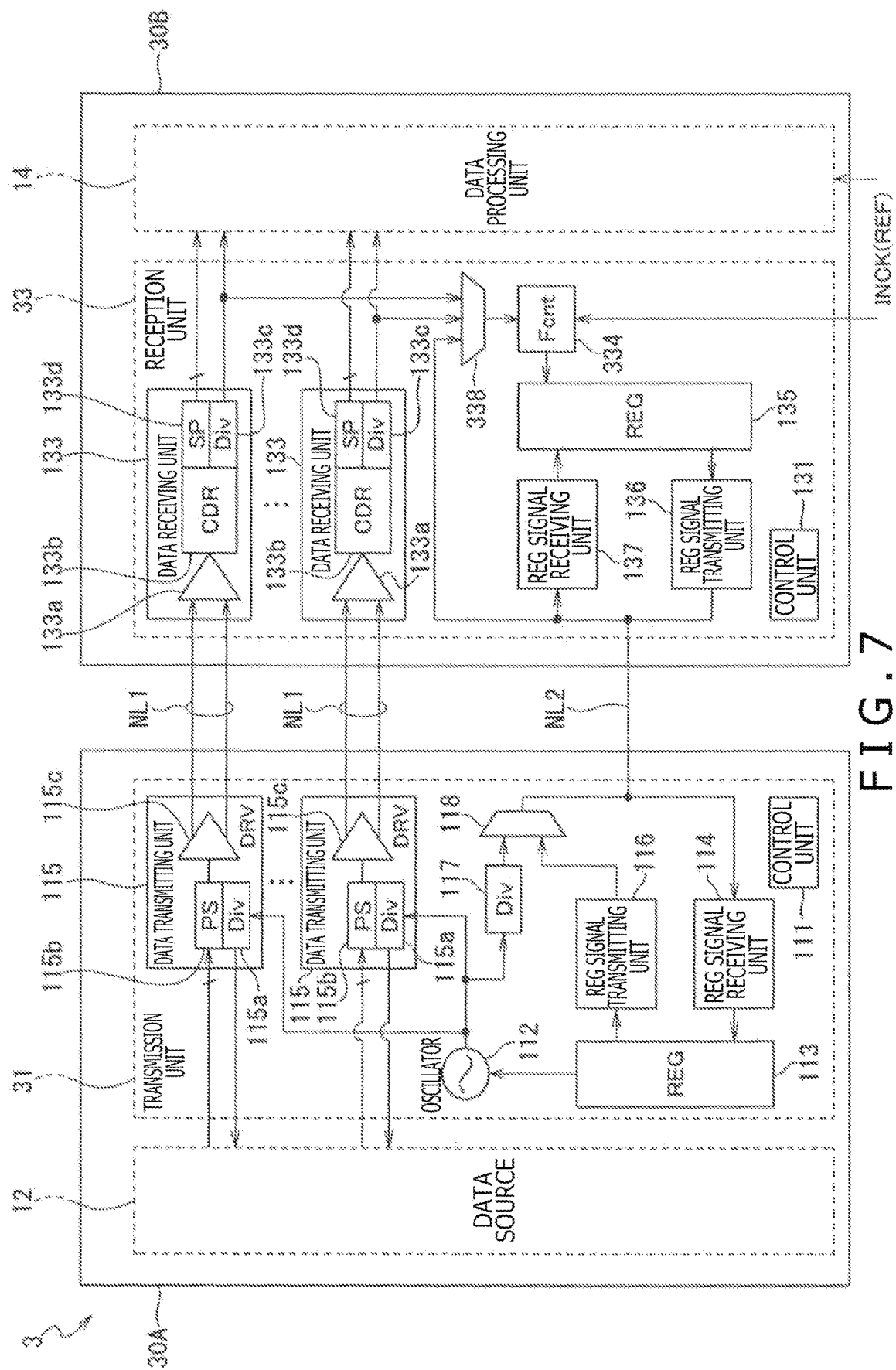
FIG. 7 is a functional block diagram illustrating schematic configurations of a sensor device, a reception device, and a transmission/reception system according to a third embodiment of the present technology.

A sensor device, a reception device, and a transmission/reception system according to a third embodiment of the present technology are described by using FIG. 7. Note that components having the same actions and functions as the sensor device, the reception device, and the transmission/reception system according to the first embodiment described above are denoted by the same reference signs to omit the description.

In the sensor device, the reception device, and the transmission/reception system according to the third embodiment, multiple data transmitting units and multiple data receiving units are included.

As illustrated in FIG. 7, a transmission/reception system 3 according to the third embodiment includes a sensor device 30A configured to transmit a predetermined signal and a reception device 30B configured to receive a predetermined signal transmitted from the sensor device 30A.

A transmission unit 31 included in the sensor device 30A includes multiple (two illustrated in FIG. 7) data transmitting units 115. The multiple data transmitting units 115 are each the same in configuration and function as the data transmitting unit 115 of the first embodiment described above.

A reception unit 33 included in the reception device 30B includes multiple (two illustrated in FIG. 7) data receiving units 133. The multiple data receiving units 133 are each the same in configuration and function as the data receiving unit 133 of the first embodiment described above. The number of the data receiving units 133 provided in the reception unit 33 is the same as the number of the data transmitting units 115 provided in the transmission unit 31. The data transmitting units 115 and the data receiving units 133 are connected to each other in a one-to-one relation.

A signal generating unit 334 included in the reception unit 33 receives the second clock signal CLK2 output from each of the multiple data receiving units 133 through a switch 338. Further, the signal generating unit 334 compares all the second clock signals CLK2 input from the multiple data receiving units 133 with the reference clock signal INCK. Note that the signal generating unit 334 may compare any of the multiple second clock signals CLK2 with the reference clock signal INCK.

Actions and Effects According to Third Embodiment

According to the third embodiment described above, actions and effects similar to those of the first embodiment described above are obtained, and even when any of the multiple data transmitting units 115 and the multiple data receiving units 133 has failed to transmit the first clock signal CLK1, the first clock signal CLK1 can be controlled based on a comparison between the second clock signal CLK2 and the reference clock signal INCK by the signal generating unit 334 of the reception device 30B.

Note that the driver 115c of each of the multiple data transmitting units 115 may output, for example, the single-end imaging data Ds input from the parallel-to-serial conversion unit 115b in synchronization with the first clock signal CLK1, as single-end imaging data.

Fourth Embodiment

A sensor device, a reception device, and a transmission/reception system according to a fourth embodiment of the present technology are described by using FIG. 8. Note that components having the same actions and functions as the sensor device, the reception device, and the transmission/reception system according to the third embodiment described above are denoted by the same reference signs to omit the description.

In the sensor device, the reception device, and the transmission/reception system according to the fourth embodiment, multiple data transmitting units, multiple data receiving units, and frequency-variable frequency dividers for the respective data transmitting units are included.

As illustrated in FIG. 8, a transmission/reception system 4 according to the fourth embodiment includes a sensor device 40A configured to transmit a predetermined signal and a reception device 40B configured to receive a predetermined signal transmitted from the sensor device 40A.

A transmission unit 41 included in the sensor device 40A includes multiple (two illustrated in FIG. 8) data transmitting units 115. The multiple data transmitting units 115 are each the same in configuration and function as the data transmitting unit 115 of the first embodiment described above. Further, the multiple data transmitting units 115 are each provided with a frequency-variable frequency divider 411. The first clock signal CLK1 output from the oscillator 112 is changed in frequency by the frequency divider 411 and then input to the frequency divider 115a of the data transmitting unit 115. A frequency setting value to be set to the frequency divider 411 is stored in the register 113. Then, an optimum frequency setting value is set to the frequency divider 411 under the control of the control unit 111.

A reception unit 43 included in the reception device 40B includes multiple (two illustrated in FIG. 8) data receiving units 133. The multiple data receiving units 133 are each the same in configuration and function as the data receiving unit 133 of the first embodiment described above. The number of the data receiving units 133 provided in the reception unit 43 is the same as the number of the data transmitting units 115 provided in the transmission unit 41. The data transmitting units 115 and the data receiving units 133 are connected to each other in a one-to-one relation.

The signal generating unit 334 included in the reception unit 43 receives the second clock signal CLK2 output from each of the multiple data receiving units 133 through the switch 338. Further, the signal generating unit 334 compares all the second clock signals CLK2 input from the multiple data receiving units 133 with the reference clock signal INCK. Note that the signal generating unit 334 may compare any of the multiple second clock signals CLK2 with the reference clock signal INCK.

In the sensor device 40A, multiple frequency setting values different from each other in setting content are stored in the register 113 for each lane including the data transmitting unit 115 and the data receiving unit 133. The control unit 111 monitors a load status of each lane. The control unit 111 reads a first frequency setting value for setting a low frequency from the register 113 and sets the first frequency setting value to the frequency divider 411 with regard to a lane with a large load, and reads a second frequency setting value for setting a high frequency from the register 113 and sets the second frequency setting value to the frequency divider 411 with regard to a lane with a small load.

Further, for example, the control unit 111 can read a second frequency setting value for setting a high frequency from the register 113 and set the second frequency setting value to the frequency divider 411 at a temperature of 25° C., and read a first frequency setting value for setting a low frequency from the register 113 and set the first frequency setting value to the frequency divider 411 at a temperature of 40° C. Note that, as frequency setting value change conditions, for example, processes or power sources can be used other than temperature.

Actions and Effects According to Fourth Embodiment

According to the fourth embodiment described above, actions and effects similar to those of the third embodiment described above are obtained, and the frequency of the first clock signal CLK1, which is controlled from the reception device 40B side, is changed depending on conditions such as processes, power sources, or temperature, thereby allowing the transmission/reception system 4 to efficiently and stably operate.

Further, according to the fourth embodiment described above, the load status of each lane is monitored, and the data rate of each lane is changed depending on the load status, thereby allowing the transmission/reception system 4 to efficiently operate.

Fifth Embodiment

Figure 9:
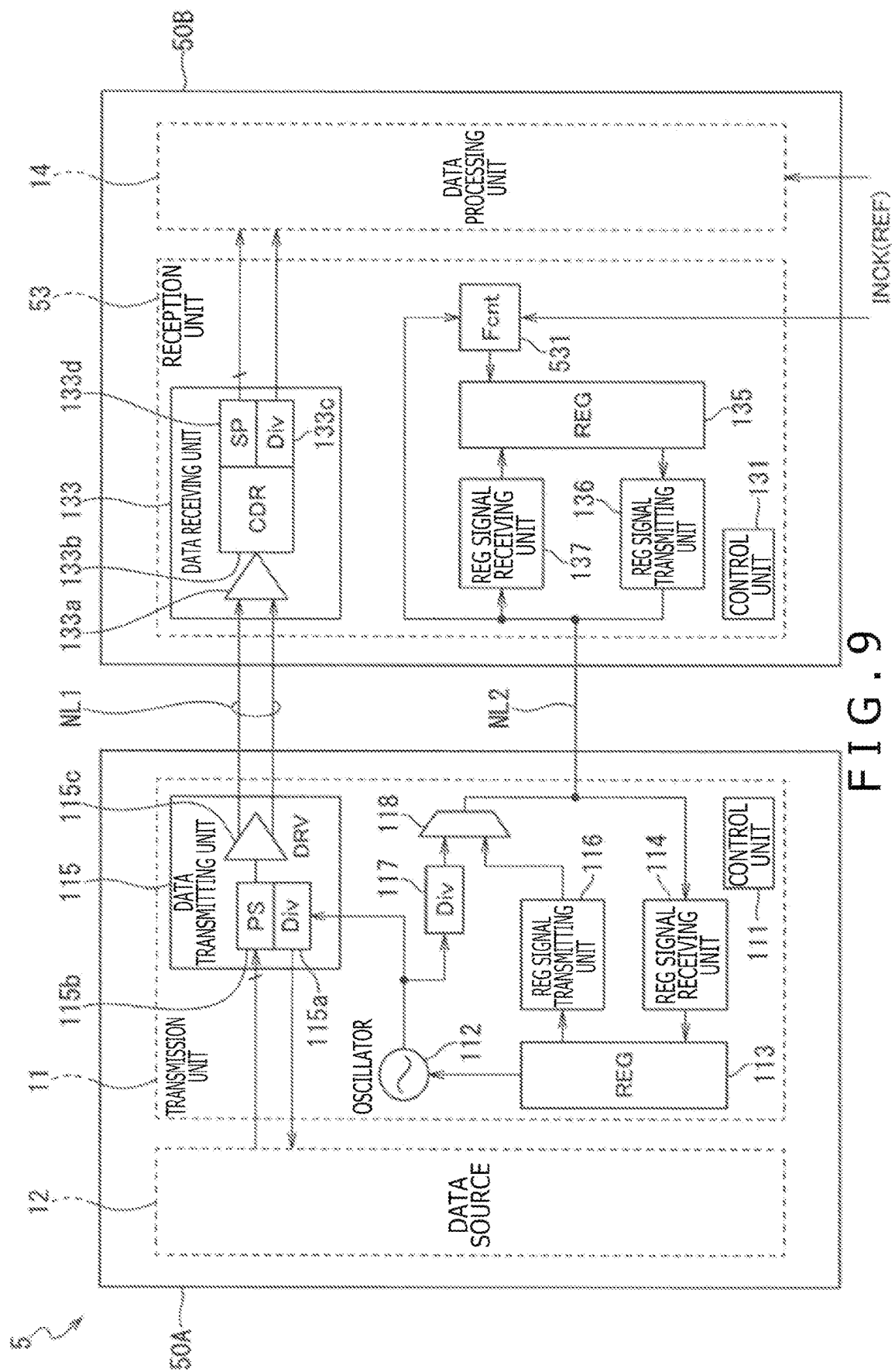
FIG. 9 is a functional block diagram illustrating schematic configurations of a sensor device, a reception device, and a transmission/reception system according to a fifth embodiment of the present technology.

A sensor device, a reception device, and a transmission/reception system according to a fifth embodiment of the present technology are described by using FIG. 9. Note that components having the same actions and functions as the sensor device, the reception device, and the transmission/reception system according to the first embodiment described above are denoted by the same reference signs to omit the description.

In a sensor device 50A, a reception device 50B, and a transmission/reception system 5 according to the fifth embodiment, in the reception device 50B, the switch 138 is omitted, and the second clock signal CLK2 transmitted from the sensor device 50A through the signal transmission path NL2 is directly input to a signal generating unit 531.

Figure 10:
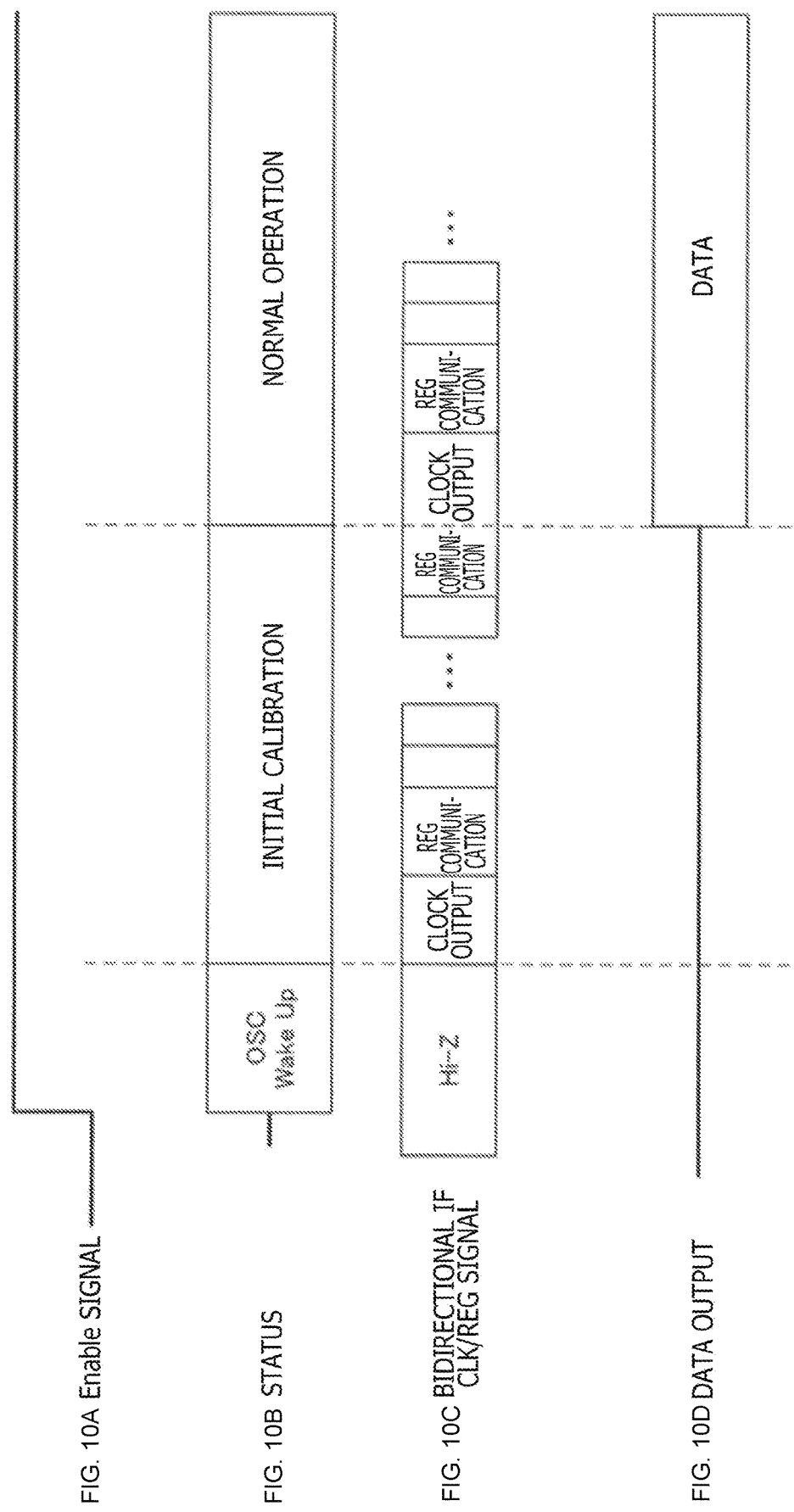
FIGS. 10A, 10B, 10C, and 10D are timing charts illustrating communication operation between the sensor device and the reception device that is executed during and after a boot of the transmission/reception system according to the fifth embodiment of the present technology.
Figure 11:
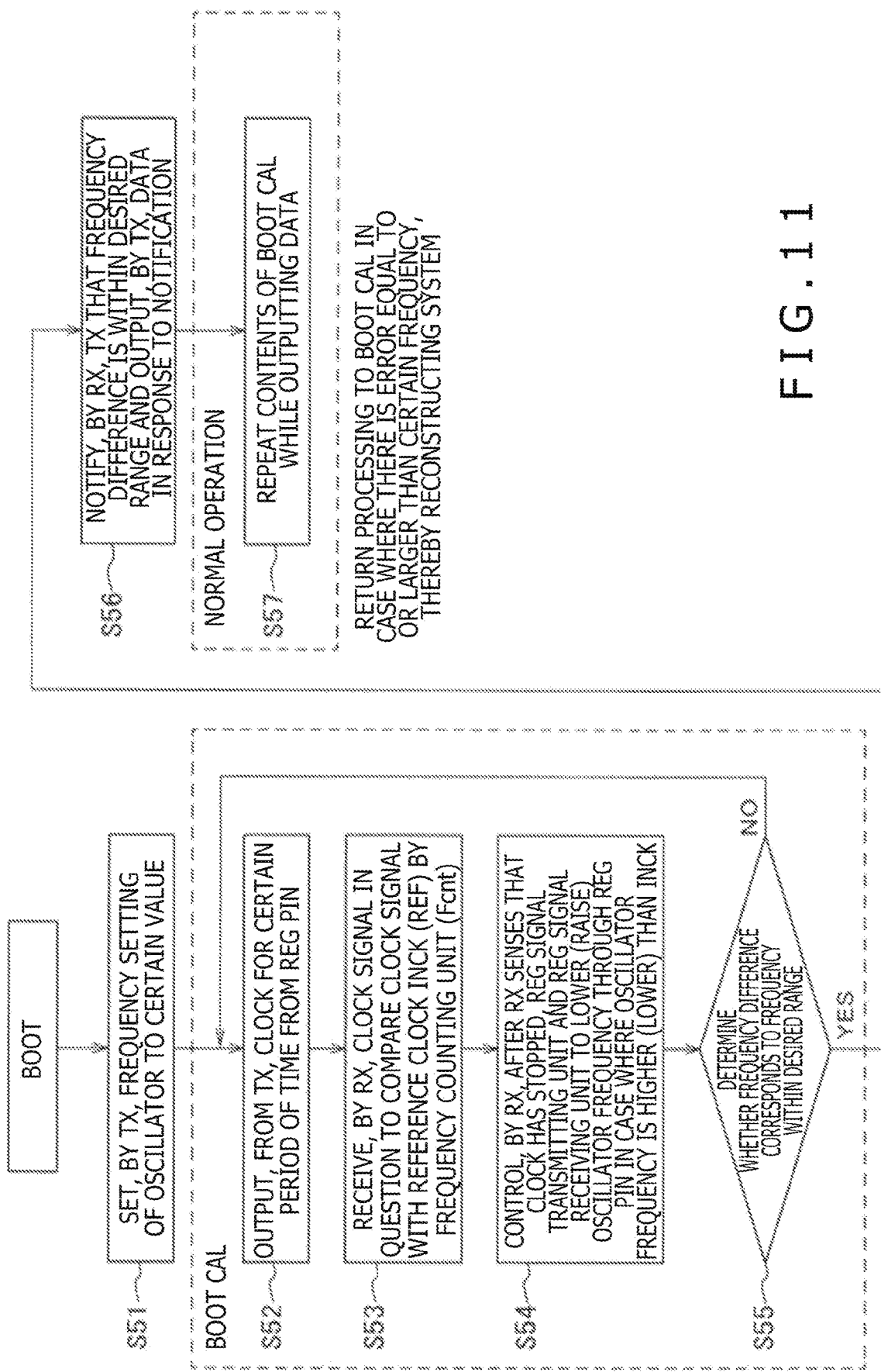
FIG. 11 is a flowchart illustrating control processing of a clock signal frequency that is executed during and after the boot of the transmission/reception system according to the fifth embodiment of the present technology.

<Operation of Transmission/Reception System According to Fifth Embodiment> Next, control processing of a clock signal frequency by the sensor device 50A, the reception device 50B, and the transmission/reception system 5 according to the fifth embodiment is described by using FIGS. 10A, 10B, 10C, 10D, and 11 with reference also to FIG. 9. FIGS. 10A, 10B, 10C, and 10D are timing charts illustrating communication operation between the sensor device 50A and the reception device 50B that is executed during and after a boot of the transmission/reception system 5. FIG. 11 is a flowchart illustrating the control processing of a clock signal frequency that is executed during and after the boot of the transmission/reception system 5. In the fifth embodiment, to facilitate the understanding, the processing flow of the transmission/reception system 5 is divided into processing during boot (initial calibration) and processing in operation after boot (normal operation).

In the transmission/reception system 5 according to the fifth embodiment, first, when the sensor device 50A and the reception device 50B are powered on, an enable signal illustrated in FIG. 10A changes from low to high, and processing during boot starts (OSC Wake up illustrated in FIG. 10B).

(Step S51 of FIG. 11)

As illustrated in FIG. 11, in Step S51, the sensor device 50A waits until a certain period of time has elapsed from the boot and sets the frequency of the first clock signal CLK1 to a predetermined value, and the processing proceeds to Step S52. The control unit 111 of the sensor device 50A sets, to the setting value of the oscillator 112, the initial value (for example, the setting value) of the frequency of the first clock signal CLK1 as a predetermined value.

(Step S52 of FIG. 11) In initial calibration illustrated in FIG. 10B, the sensor device 50A divides the first clock signal CLK1 with the frequency having the predetermined value set in Step S51 to obtain the second clock signal CLK2 and transmits the second clock signal CLK2 to the reception device 50B through the signal transmission path NL2. At this time, the control unit 111 controls the frequency divider 117 and the switch 118 to transmit the second clock signal CLK2 (clock output illustrated in FIG. 10C) to the reception device 50B through the signal transmission path NL2.

(Step S53 of FIG. 11)

Following Step S52, the transmission/reception system 5 executes the control processing of the second clock signal CLK2 transmitted from the sensor device 50A to the reception device 50B. In the control processing of the second clock signal CLK2, first, the reception device 50B executes clock signal comparison processing of comparing the second clock signal CLK2 transmitted from the sensor device 50A with the reference clock signal INCK. In the clock signal comparison processing, the signal generating unit 531 acquires, under the control of the control unit 131, a difference between the frequency of the second clock signal CLK2 transmitted from the sensor device 50A and the frequency of the reference clock signal INCK input from the outside of the reception device 50B.

(Step S54 of FIG. 11)

Before the clock signal comparison processing is executed, in the sensor device 50A, the control unit 111 transmits the second clock signal CLK2 a specified number of times to the reception device 50B and then stops the oscillator 112.

In the reception device 50B, the control unit 131 receives the second clock signal CLK2 the specified number of times from the sensor device 50A to sense that the oscillator 112 has stopped, and then controls, on the basis of the difference between the frequency of the second clock signal CLK2 and the frequency of the reference clock signal INCK, which has been acquired by the signal generating unit 531, the register signal transmitting unit 136 and the register signal receiving unit 137 to change the setting value of the oscillator 112 (initial calibration illustrated in FIG. 10B and REG communication illustrated in FIG. 10C).

(Step S55 of FIG. 11)

Assume that the frequency difference between the second clock signal CLK2 and the reference clock signal INCK is larger than the maximum frequency resolution settable to the oscillator 112. In this case, the control unit 131 determines that the frequency of the second clock signal CLK2 transmitted from the sensor device 50A does not have an optimum value (NO)). With this, the reception device 50B transmits the register signal Rs to the sensor device 50A. The signal generating unit 531 includes a frequency code (NG) indicating that the frequency of the first clock signal CLK1 does not have an optimum value in the register signal Rs, and the processing returns to Step S52 described above. The transmission/reception system 5 repeats the processing until the second clock signal CLK2 and the reference clock signal INCK that have had a frequency difference outside a predetermined error range have a frequency difference within the predetermined error range and the frequency of the first clock signal CLK1 has an optimum value. The transmission/reception system 5 returns from Step S55 to Step S52 and then executes the processing in Step S52 to Step S55.

Meanwhile, assume that the frequencies of the second clock signal CLK2 and the reference clock signal INCK are identical as a result of the clock signal comparison processing by the signal generating unit 531, or that the frequency difference between the second clock signal CLK2 and the reference clock signal INCK, which has been obtained by the signal generating unit 531, is smaller than the maximum frequency resolution settable to the oscillator 112. In this case, the control unit 131 determines that the frequency of the first clock signal CLK1 transmitted from the sensor device 50A has an optimum value (YES).

(Step S56 of FIG. 11)

When it is determined that the frequency of the first clock signal CLK1 transmitted from the sensor device 50A has an optimum value, the signal generating unit 531 includes a frequency code (OK) indicating that the frequency of the first clock signal CLK1 has an optimum value in the register signal Rs. The control unit 131 controls the register signal transmitting unit 136 to transmit the register signal Rs to the sensor device 50A.

In the sensor device 50A, the control unit 111 controls the register signal receiving unit 114 to receive the register signal Rs transmitted from the reception device 50B and makes, in a case where the frequency code (OK) is included, the sensor device 50A enter a state where boot processing (initial calibration illustrated in FIG. 10B) has been complete. With this, the processing during the boot of the sensor device 50A and the reception device 50B ends, and the sensor device 50A starts the normal operation processing (normal operation illustrated in FIG. 10B).

(Step S57 of FIG. 11)

The sensor device 50A changes the parallel-format imaging data Dp to the serial-format imaging data Ds and embeds the first clock signal CLK1 in the imaging data Ds to generate the clock-embedded signal EB. Note that the sensor device 50A does not necessarily embed the first clock signal CLK1 in the imaging data Ds. The parallel-to-serial conversion unit 115b of the data transmitting unit 115 outputs, under the control of the control unit 111, the imaging data Ds synchronized with the first clock signal CLK1 input from the oscillator 112, to the driver 115c. The driver 115c embeds the imaging data Ds input from the parallel-to-serial conversion unit 115b and the first clock signal CLK1 input from the oscillator 112 in the differential imaging data Ds. In this way, the driver 115c generates the clock-embedded signal EB.

The sensor device 50A outputs the clock-embedded signal EB (data illustrated in FIG. 10D) to the reception device 50B through the signal transmission path NL1. The data transmitting unit 115 transmits, under the control of the control unit 111, the clock-embedded signal EB generated by the driver 115c to the reception device 50B. Further, in the sensor device 50A, also in normal operation, the control unit 111 transmits the second clock signal CLK2 a specified number of times to the reception device 50B and then stops the oscillator 112.

In the reception device 50B, the control unit 131 receives the clock-embedded signal EB and receives the second clock signal CLK2 the specified number of times from the sensor device 50A to sense that the oscillator 112 has stopped, and then controls, on the basis of the difference between the frequency of the second clock signal CLK2 and the frequency of the reference clock signal INCK, which has been acquired by the signal generating unit 134, the register signal transmitting unit 136 and the register signal receiving unit 137 to communicate the register signal Rs through the signal transmission path NL2 (normal operation illustrated in FIG. 10B and clock output and REG communication illustrated in FIG. 10C), thereby changing the setting value of the oscillator 112.

After that, the transmission/reception system 5 repeatedly executes the processing in Step S52 to Step S55.

Note that the signal generating unit 531 includes, in a case where the frequency difference between the second clock signal CLK2 and the reference clock signal INCK has a certain frequency value or larger, initialization information indicating returning of the processing to initial calibration in the register signal Rs. The control unit 131 controls the register signal transmitting unit 136 to transmit the register signal Rs to the sensor device 50A.

In the sensor device 50A, the control unit 111 receives the register signal Rs transmitted from the reception device 50B and makes, in a case where the initialization information is included, the sensor device 50A enter a state for executing initial calibration. With this, the sensor device 50A starts initial calibration to reconstruct the transmission/reception system 5.

Actions and Effects According to Fifth Embodiment

According to the fifth embodiment described above, actions and effects similar to those of the first embodiment described above are obtained, and the second clock signal CLK2 and the register signal Rs are intermittently operated by using the signal transmission path NL2 to control the first clock signal CLK1, so that, even when the first clock signal CLK1 has failed to be extracted from the reproduction unit 133b of the reception device 50B during data communication, the first clock signal CLK1 can be controlled based on a comparison between the second clock signal CLK2 and the reference clock signal INCK by the signal generating unit 531.

Sixth Embodiment

Figure 12:
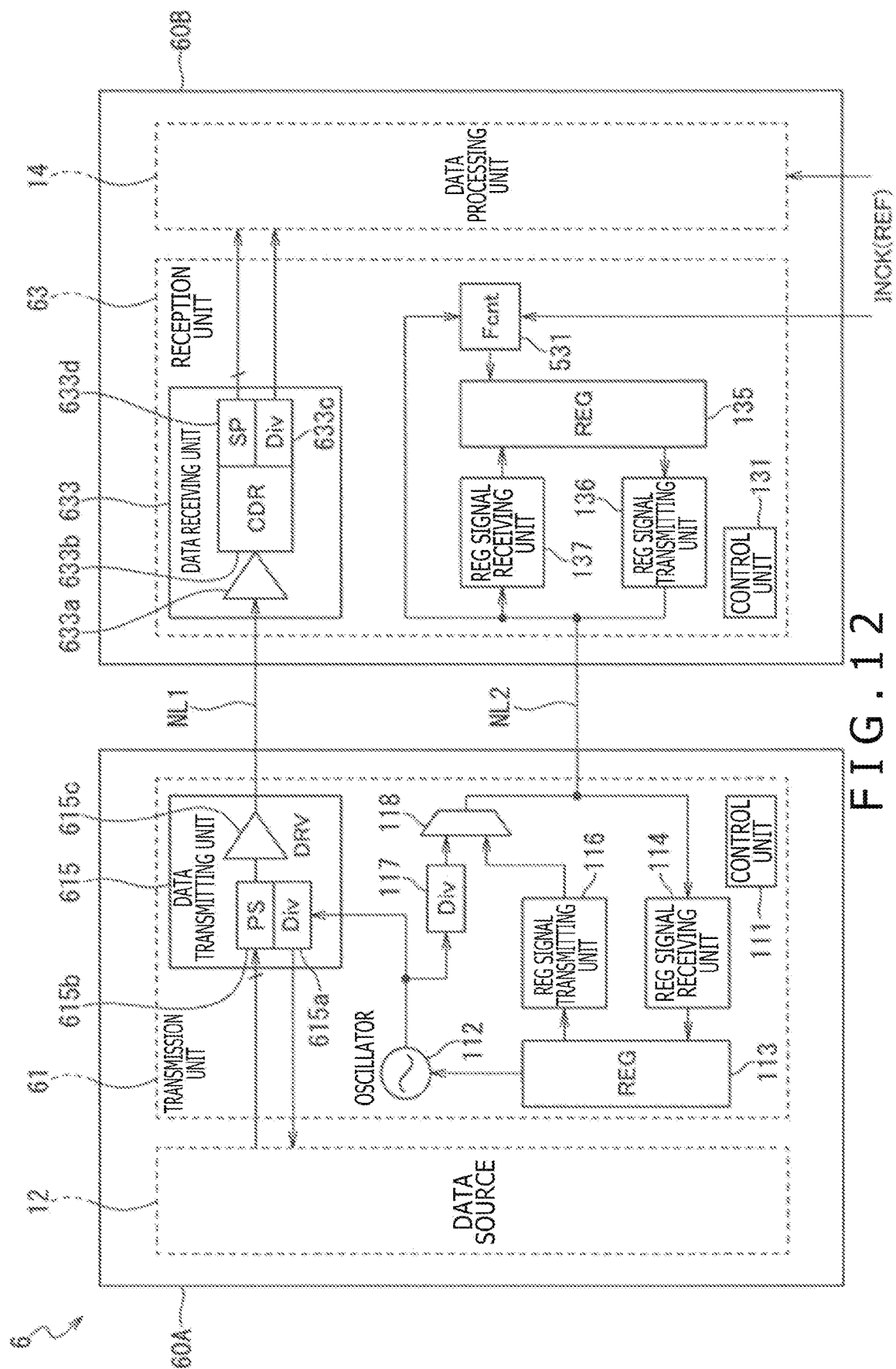
FIG. 12 is a functional block diagram illustrating schematic configurations of a sensor device, a reception device, and a transmission/reception system according to a sixth embodiment of the present technology.

A sensor device, a reception device, and a transmission/reception system according to a sixth embodiment of the present technology are described by using FIG. 12. Note that components having the same actions and functions as the sensor device, the reception device, and the transmission/reception system according to the fifth embodiment described above are denoted by the same reference signs to omit the description.

As illustrated in FIG. 12, a transmission/reception system 6 according to the sixth embodiment includes a sensor device 60A configured to transmit a predetermined signal and a reception device 60B configured to receive a predetermined signal transmitted from the sensor device 60A.

A transmission unit 61 of the sensor device 60A includes a data transmitting unit 615. The data transmitting unit 615 includes a frequency divider 615a configured to receive the first clock signal CLK1, a parallel-to-serial conversion unit 615b, and a driver 615c. The driver 615c of the data transmitting unit 615 outputs, for example, the single-end imaging data Ds input from the parallel-to-serial conversion unit 615b in synchronization with the first clock signal CLK1, to the signal transmission path NL1 as single-end imaging data.

A reception unit 63 of the reception device 60B includes a data receiving unit 633. The data receiving unit 633 includes a driver 633a, a reproduction unit 633b, a frequency divider 633c, and a serial-to-parallel conversion unit 633d. The driver 633a of the data receiving unit 633 outputs the single-end imaging data Ds input from the driver 615c of the sensor device 60A, to the reproduction unit 633b on the subsequent stage.

Actions and Effects According to Sixth Embodiment

According to the sixth embodiment, actions and effects similar to those of the fifth embodiment described above are obtained, and a reduced number of pins (number of terminals) used for input and output or the like of the transmission unit 61 and the reception unit 63 can be implemented.

Seventh Embodiment

Figure 13:
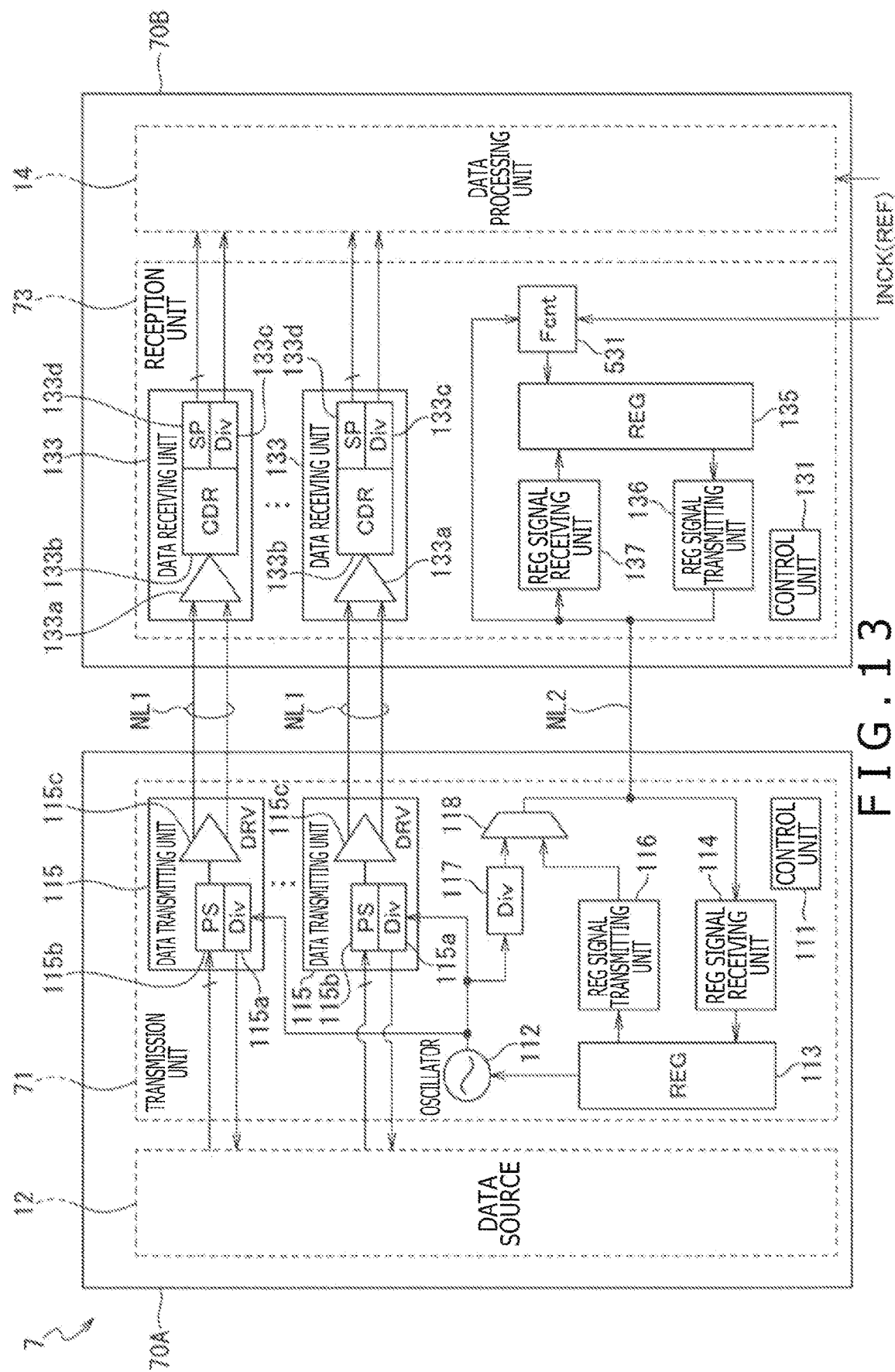
FIG. 13 is a functional block diagram illustrating schematic configurations of a sensor device, a reception device, and a transmission/reception system according to a seventh embodiment of the present technology.

A sensor device, a reception device, and a transmission/reception system according to a seventh embodiment of the present technology are described by using FIG. 13. Note that components having the same actions and functions as the sensor device, the reception device, and the transmission/reception system according to the fifth embodiment described above are denoted by the same reference signs to omit the description.

In the sensor device, the reception device, and the transmission/reception system according to the seventh embodiment, multiple data transmitting units and multiple data receiving units are included.

As illustrated in FIG. 13, a transmission/reception system 7 according to the seventh embodiment includes a sensor device 70A configured to transmit a predetermined signal and a reception device 70B configured to receive a predetermined signal transmitted from the sensor device 70A.

A transmission unit 71 included in the sensor device 70A includes multiple (two illustrated in FIG. 13) data transmitting units 115. The multiple data transmitting units 115 are each the same in configuration and function as the data transmitting unit 115 of the first embodiment described above.

A reception unit 73 included in the reception device 70B includes multiple (two illustrated in FIG. 13) data receiving units 133. The multiple data receiving units 133 are each the same in configuration and function as the data receiving unit 133 of the first embodiment described above. The number of the data receiving units 133 provided in the reception unit 73 is the same as the number of the data transmitting units 115 provided in the transmission unit 71. The data transmitting units 115 and the data receiving units 133 are connected to each other in a one-to-one relation.

Actions and Effects According to Seventh Embodiment

According to the seventh embodiment described above, actions and effects similar to those of the fifth embodiment described above are obtained.

Note that the driver 115c of each of the multiple data transmitting units 115 may output, for example, the single-end imaging data Ds input from the parallel-to-serial conversion unit 115b in synchronization with the first clock signal CLK1, as single-end imaging data.

Eighth Embodiment

Figure 14:
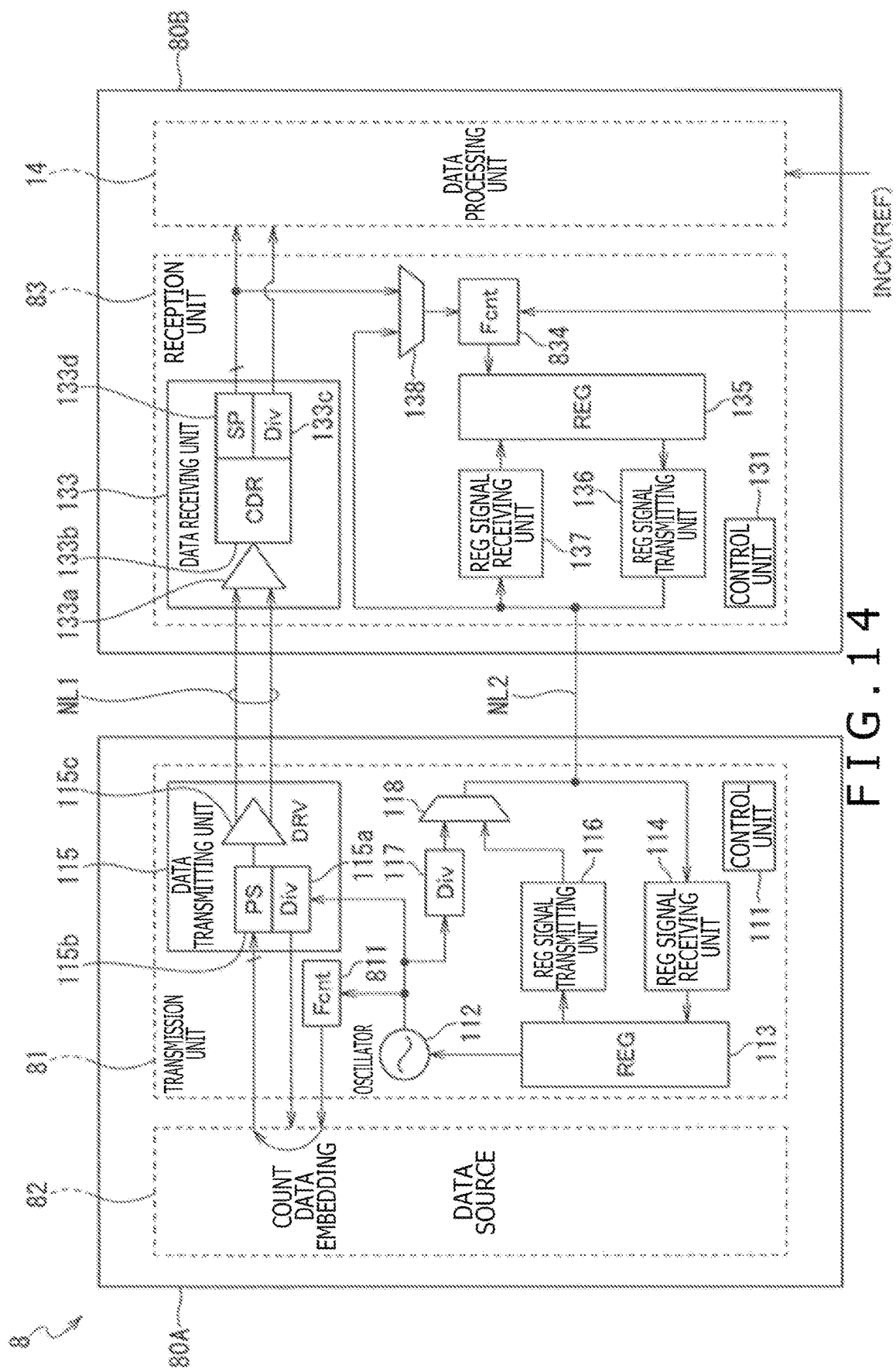
FIG. 14 is a functional block diagram illustrating schematic configurations of a sensor device, a reception device, and a transmission/reception system according to an eighth embodiment of the present technology.

A sensor device, a reception device, and a transmission/reception system according to an eighth embodiment of the present technology are described by using FIG. 14. Note that components having the same actions and functions as the sensor device, the reception device, and the transmission/reception system according to the first embodiment described above are denoted by the same reference signs to omit the description.

In a sensor device 80A, a reception device 80B, and a transmission/reception system 8 according to the eighth embodiment, a transmission unit 81 of the sensor device 80A includes a counter (represented as Fcnt) 811 configured to operate with the first clock signal CLK1 oscillated by the oscillator 112.

The counter 811 outputs a count value obtained by counting to a data source 82. The data source 82 embeds an input count value in the imaging data Dp and transmits the resultant to the data transmitting unit 115.

A reception unit 83 of the reception device 80B includes a signal generating unit 834. The signal generating unit 834 has a function of extracting a count value embedded in the input imaging data Dp in normal operation.

Figure 15:
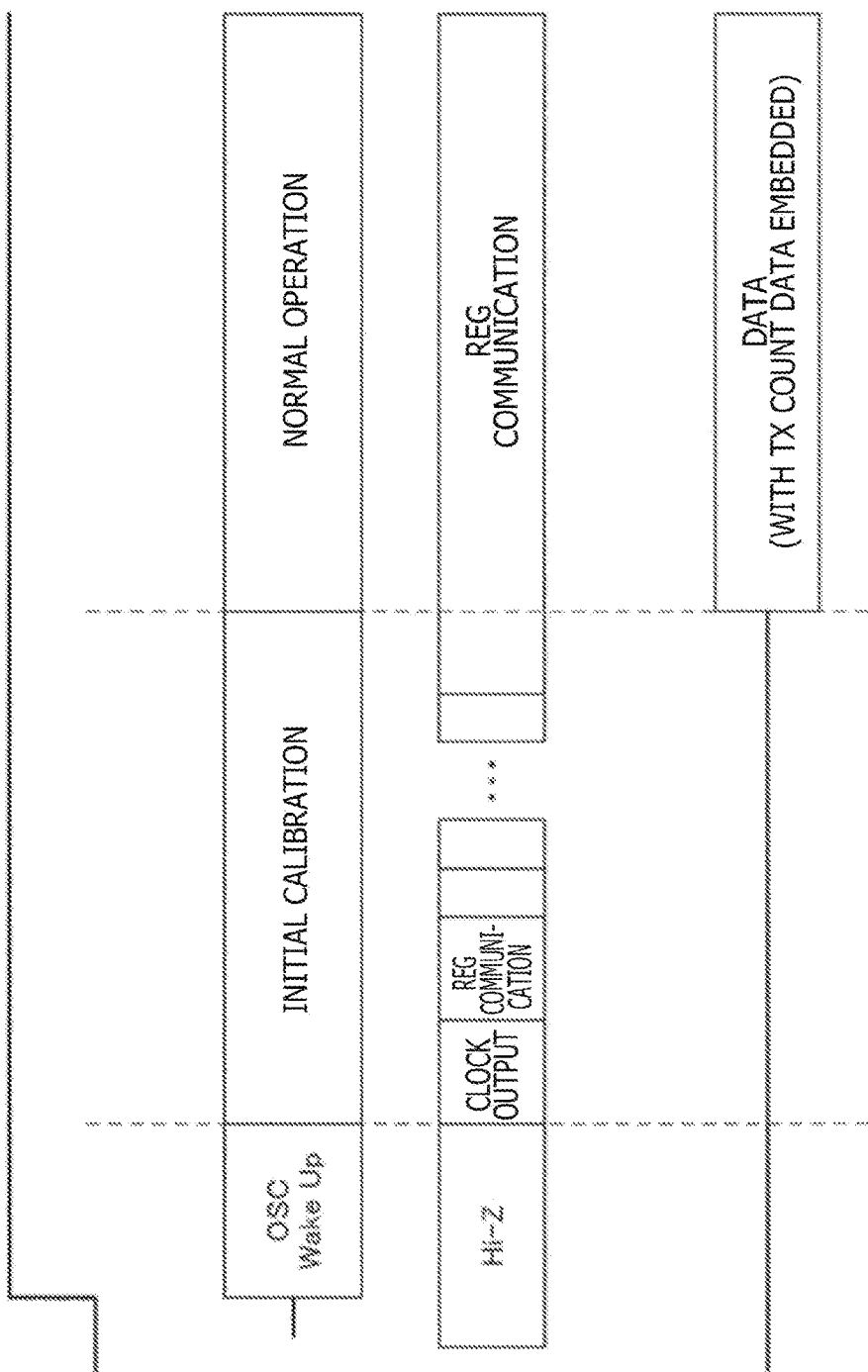
FIGS. 15A, 15B, 15C, and 15D are timing charts illustrating communication operation between the sensor device and the reception device that is executed during and after a boot of the transmission/reception system according to the eighth embodiment of the present technology.
Figure 16:
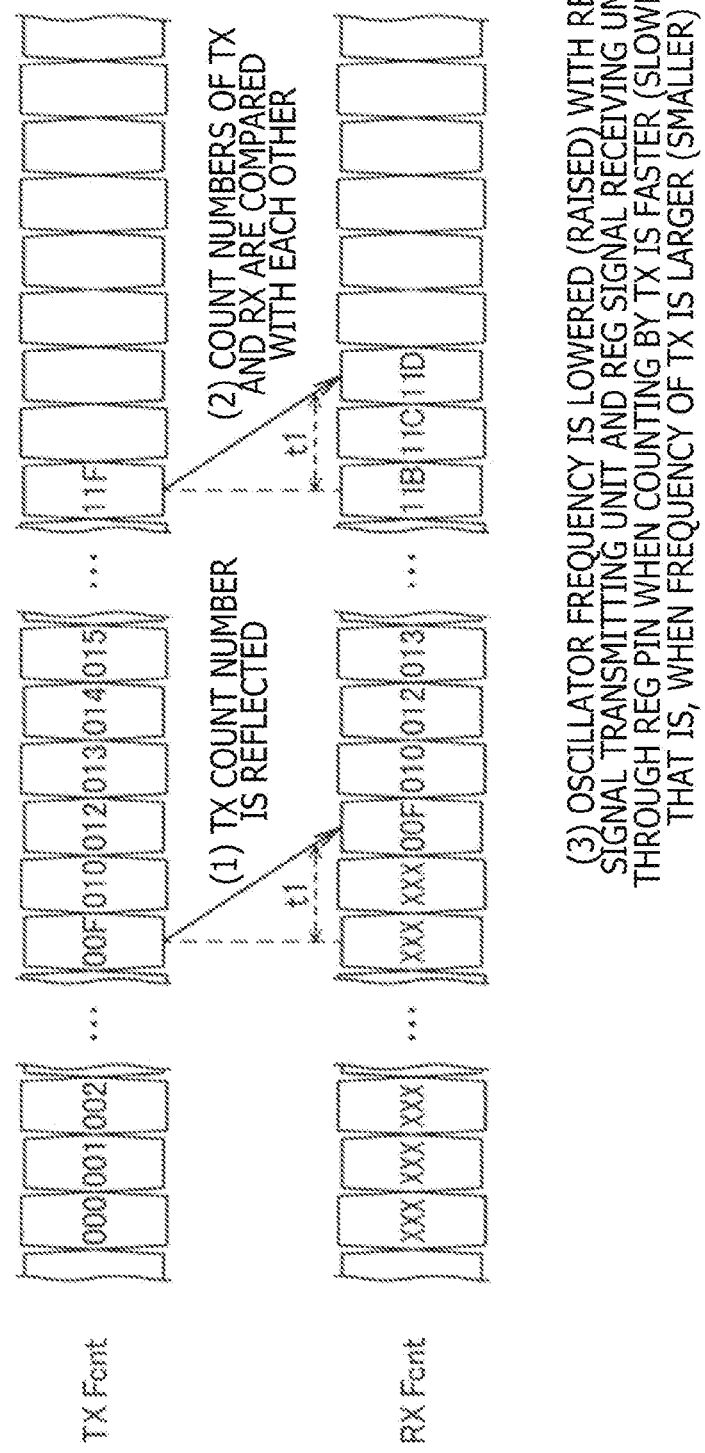
FIG. 16 is a timing chart illustrating count value comparison processing in normal operation of the transmission/reception system according to the eighth embodiment of the present technology.
Figure 17:
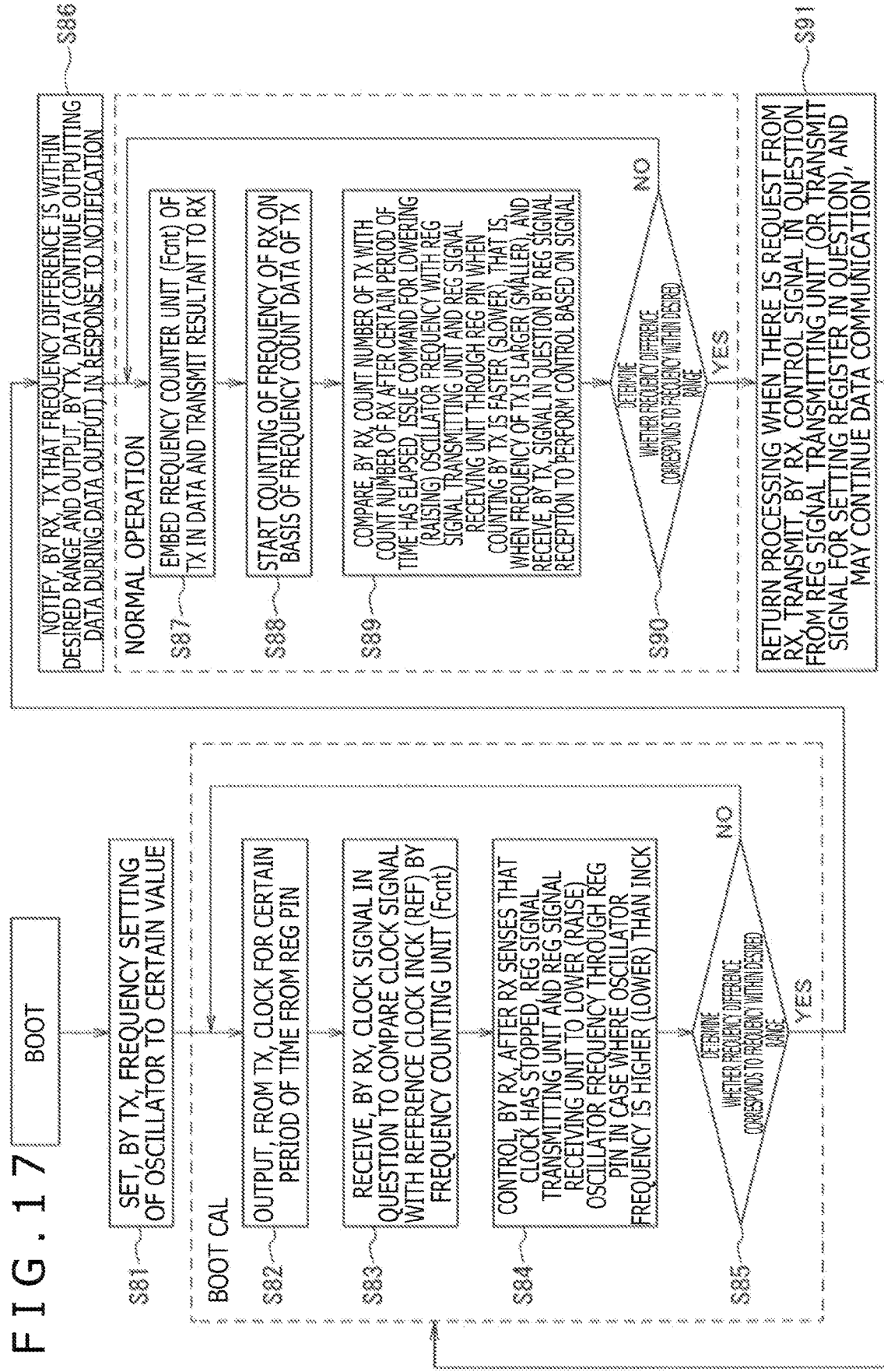
FIG. 17 is a flowchart illustrating control processing of a clock signal frequency that is executed during and after the boot of the transmission/reception system according to the eighth embodiment of the present technology.

<Operation of Transmission/Reception System According to Eighth Embodiment> Next, control processing of a clock signal frequency by the sensor device 80A, the reception device 80B, and the transmission/reception system 8 according to the eighth embodiment is described by using FIGS. 15A, 15B, 15C, 15D, 16, and 17 with reference also to FIG. 14. FIGS. 15A, 15B, 15C, and 15D are timing charts illustrating communication operation between the sensor device 80A and the reception device 80B that is executed during and after a boot of the transmission/reception system 8. FIG. 16 is a timing chart illustrating count value comparison processing in the normal operation of the transmission/reception system 8. FIG. 17 is a flowchart illustrating the control processing of a clock signal frequency that is executed during and after the boot of the transmission/reception system 8. In the eighth embodiment, to facilitate the understanding, the processing flow of the transmission/reception system 8 is divided into processing during boot (initial calibration) and processing in operation after boot (normal operation).

In the transmission/reception system 8 according to the eighth embodiment, first, when the sensor device 80A and the reception device 80B are powered on, a n enable signal illustrated in FIG. 15A changes from low to high, and processing during boot starts (OSC Wake up illustrated in FIG. 15B).

(Step S81 of FIG. 17)

As illustrated in FIG. 17, in Step S81, the sensor device 80A waits until a certain period of time has elapsed from the boot and sets the frequency of the first clock signal CLK1 to a predetermined value, and the processing proceeds to Step S82. The control unit 111 of the sensor device 80A sets, to the setting value of the oscillator 112, the initial value (for example, the setting value) of the frequency of the first clock signal CLK1 as a predetermined value.

(Step S82 of FIG. 17) In initial calibration illustrated in (b) of FIG. 15B, the sensor device 80A divides the first clock signal CLK1 with the frequency having the predetermined value set in Step S81 to obtain the second clock signal CLK2 and transmits the second clock signal CLK2 to the reception device 80B through the signal transmission path NL2. At this time, the control unit 111 controls the frequency divider 117 and the switch 118 to transmit the second clock signal CLK2 (clock output illustrated in FIG. 15C) to the reception device 80B through the signal transmission path NL2.

(Step S83 of FIG. 17)

Following Step S82, the transmission/reception system 8 executes the control processing of the second clock signal CLK2 transmitted from the sensor device 80A to the reception device 80B. In the control processing of the second clock signal CLK2, first, the reception device 80B executes clock signal comparison processing of comparing the second clock signal CLK2 transmitted from the sensor device 80A with the reference clock signal INCK. In the clock signal comparison processing, the signal generating unit 834 acquires, under the control of the control unit 131, a difference between the frequency of the second clock signal CLK2 transmitted from the sensor device 80A and the frequency of the reference clock signal INCK input from the outside of the reception device 80B.

(Step S84 of FIG. 17)

Before the clock signal comparison processing is executed, in the sensor device 80A, the control unit 111 transmits the second clock signal CLK2 a specified number of times to the reception device 80B and then stops the oscillator 112.

In the reception device 80B, the control unit 131 receives the second clock signal CLK2 the specified number of times from the sensor device 80A to sense that the oscillator 112 has stopped, and then controls, on the basis of the difference between the frequency of the second clock signal CLK2 and the frequency of the reference clock signal INCK, which has been acquired by the signal generating unit 834, the register signal transmitting unit 136 and the register signal receiving unit 137 to transmit the register signal Rs to the sensor device 80A, thereby changing the setting value of the oscillator 112 (initial calibration illustrated in FIG. 15B and REG communication illustrated in FIG. 15C).

(Step S85 of FIG. 17)

Assume that the frequency difference between the second clock signal CLK2 and the reference clock signal INCK is larger than the maximum frequency resolution settable to the oscillator 112. In this case, the control unit 131 determines that the frequency of the second clock signal CLK2 transmitted from the sensor device 80A does not have an optimum value (NO)). With this, the reception device 80B transmits the register signal Rs to the sensor device 80A. The signal generating unit 834 includes a frequency code (NG) indicating that the frequency of the first clock signal CLK1 does not have an optimum value in the register signal Rs, and the processing returns to Step S82 described above. The transmission/reception system 8 repeats the processing until the second clock signal CLK2 and the reference clock signal INCK that have had a frequency difference outside a predetermined error range have a frequency difference within the predetermined error range and the frequency of the first clock signal CLK1 has an optimum value. The transmission/reception system 8 returns from Step S85 to Step S82 and then executes the processing in Step S82 to Step S85.

Meanwhile, assume that the frequencies of the second clock signal CLK2 and the reference clock signal INCK are identical as a result of the clock signal comparison processing by the signal generating unit 834, or that the frequency difference between the second clock signal CLK2 and the reference clock signal INCK, which has been obtained by the signal generating unit 834, is smaller than the maximum frequency resolution settable to the oscillator 112. In this case, the control unit 131 determines that the frequency of the first clock signal CLK1 transmitted from the sensor device 80A has an optimum value (YES).

(Step S86 of FIG. 17)

When it is determined that the frequency of the first clock signal CLK1 transmitted from the sensor device 80A has an optimum value, the signal generating unit 834 includes a frequency code (OK) indicating that the frequency of the first clock signal CLK1 has an optimum value in the register signal Rs. The control unit 131 controls the register signal transmitting unit 136 to transmit the register signal Rs to the sensor device 80A.

In the sensor device 80A, the control unit 111 controls the register signal receiving unit 114 to receive the register signal Rs transmitted from the reception device 80B and makes, in a case where the frequency code (OK) is included, the sensor device 80A enter a state where boot processing (initial calibration illustrated in FIG. 15B) has been complete. With this, the processing during the boot of the sensor device 80A and the reception device 80B ends, and the sensor device 80A starts the normal operation processing (normal operation illustrated in FIG. 15B).

(Step S87 of FIG. 17)

The sensor device 80A embeds a count value obtained by counting by the counter 811 in the parallel-format imaging data Dp to change the parallel-format imaging data Dp to the serial-format imaging data Ds, and embeds the first clock signal CLK1 in the imaging data Ds to generate the clock-embedded signal EB. The parallel-to-serial conversion unit 115*b* of the data transmitting unit 115 outputs, under the control of the control unit 111, the imaging data Ds synchronized with the first clock signal CLK1 input from the oscillator 112, to the driver 115*c*. The driver 115*c* embeds the imaging data Ds input from the parallel-to-serial conversion unit 115*b* and the first clock signal CLK1 input from the oscillator 112 in the differential imaging data Ds. In this way, the driver 115*c* generates the clock-embedded signal EB.

The sensor device 80A outputs the clock-embedded signal EB (data illustrated in FIG. 15D) to the reception device 80B through the signal transmission path NL1. The data transmitting unit 115 transmits, under the control of the control unit 111, the clock-embedded signal EB generated by the driver 115*c* to the reception device 80B.

The reception device 80B reproduces the first clock signal CLK1 from the clock-embedded signal EB transmitted from the sensor device 80A and converts the serial-format imaging data Ds to the parallel-format imaging data Dp. Under the control of the control unit 131, the data receiving unit 133 outputs the imaging data Dp synchronized with the second clock signal CLK2 to the data processing unit 14 and outputs the imaging data Dp to the signal generating unit 834 through the switch 138.

(Step S88 of FIG. 17)

As described in (1) of FIG. 16, when extracting a count value "00F" from the input imaging data Dp, the signal generating unit 834 resets the counter configured to operate with the reference clock signal INCK and starts counting from an initial value being the count value "00F."

(Step S89 of FIG. 17)

As described in (2) of FIG. 16, when extracting a count value "11F" from the input imaging data Dp after a certain period of time, the signal generating unit 834 determines whether or not a count value that the counter configured to operate with the reference clock signal INCK is to obtain by counting after time t1 is "11F." Here, since a count value "11D" is obtained, which means that counting by the sensor device 80A is faster, the control unit 131 controls the register signal transmitting unit 136 and the register signal receiving unit 137 to transmit the register signal Rs including a frequency code reflecting a high frequency to the sensor device 80A through the signal transmission path NL2 ((3) of FIG. 16).

In the sensor device 80A, when receiving the register signal Rs from the reception device 80B, the control unit 111 reads, in a case where the frequency code reflecting a high frequency is included, a frequency setting value lower than the frequency setting value set to the oscillator 112 from the register 113 to change the setting of the oscillator 112.

(Step S90 of FIG. 17)

In a case where the control unit 131 determines that the frequency difference does not correspond to a frequency within a desired range on the basis of a difference between the count value of the sensor device 80A and the count value of the reception device 80B (NO), the control unit 131 includes a frequency code (NG) indicating that the frequency of the first clock signal CLK1 does not have an optimum value in the register signal Rs and transmits the register signal Rs to the sensor device 80A, and the processing returns to Step S87 described above. The transmission/reception system 8 repeats the processing until the first clock signal CLK1 and the reference clock signal INCK that have had a frequency difference outside a predetermined error range have a frequency difference within the predetermined error range and the frequency of the first clock signal CLK1 has an optimum value. The transmission/reception system 8 returns from Step S90 to Step S87 and then executes normal operation or clock signal control operation depending on the frequency of the first clock signal CLK1.

Meanwhile, assume that the count value of the sensor device 80A and the count value of the reception device 80B are identical, or that it is determined from the difference between the count value of the sensor device 80A and the count value of the reception device 80B that the frequency difference is smaller than the maximum frequency resolution settable to the oscillator 112. In this case, the control unit 131 determines that the frequency of the first clock signal CLK1 transmitted from the sensor device 80A has an optimum value (YES).

(Step S91 of FIG. 17)

When it is determined that the frequency of the first clock signal CLK1 transmitted from the sensor device 80A has an optimum value, the signal generating unit 834 includes a frequency code (OK) indicating that the frequency of the first clock signal CLK1 has an optimum value in the register signal Rs. The control unit 131 controls the register signal transmitting unit 136 to transmit the register signal Rs to the sensor device 80A.

In the sensor device 80A, the control unit 111 receives the register signal Rs transmitted from the reception device 80B and maintains data communication in a case where the frequency code (OK) is included.

Note that the signal generating unit 834 includes, in a case where the frequency difference between the first clock signal CLK1 and the reference clock signal INCK has a certain frequency value or larger, initialization information indicating returning of the processing to initial calibration in the register signal Rs. The control unit 131 controls the register signal transmitting unit 136 to transmit the register signal Rs to the sensor device 80A.

In the sensor device 80A, the control unit 111 receives the register signal Rs transmitted from the reception device 80B and makes, in a case where the initialization information is included, the sensor device 80A enter a state for executing initial calibration. With this, the sensor device 80A starts initial calibration to reconstruct the transmission/reception system 8.

Actions and Effects According to Eighth Embodiment

According to the eighth embodiment described above, in normal operation, the sensor device 80A including the counter 811 can transmit the imaging data Dp having embedded therein a count value obtained in a predetermined period of time to the reception device 80B through the signal transmission path NL1, and the reception device 80B can compare a count value obtained by the counter configured to operate with the reference clock signal with the count value obtained by the counter 811 of the sensor device 80, thereby controlling the first clock signal CLK1 of the sensor device 80A on the basis of the comparison result. Hence, even when the first clock signal CLK1 has failed to be extracted from the reproduction unit 133b of the reception device 80B during data communication, the first clock signal CLK1 can be controlled.

Ninth Embodiment

A sensor device, a reception device, and a transmission/reception system according to a ninth embodiment of the present technology are described by using FIG. 18. Note that components having the same actions and functions as the sensor device, the reception device, and the transmission/reception system according to the eighth embodiment described above are denoted by the same reference signs to omit the description.

As illustrated in FIG. 18, a transmission/reception system 9 according to the ninth embodiment includes a sensor device 90A configured to transmit a predetermined signal and a reception device 90B configured to receive a predetermined signal transmitted from the sensor device 90A.

A transmission unit 91 of the sensor device 90A includes a data transmitting unit 915. The data transmitting unit 915 includes a frequency divider 915a configured to receive the first clock signal CLK1, a parallel-to-serial conversion unit 915b, and a driver 915c. The driver 915c of the data transmitting unit 915 outputs, for example, the single-end imaging data Ds input from the parallel-to-serial conversion unit 915b in synchronization with the first clock signal CLK1, to the signal transmission path NL1 as single-end imaging data.

A reception unit 93 of the reception device 90B includes a data receiving unit 933. The data receiving unit 933 includes a driver 933a, a reproduction unit 933b, a frequency divider 933c, and a serial-to-parallel conversion unit 933d. The driver 933a of the data receiving unit 933 outputs the single-end imaging data Ds input from the driver 915c of the sensor device 90A to the reproduction unit 933b on the subsequent stage.

Actions and Effects According to Ninth Embodiment

According to the ninth embodiment, actions and effects similar to those of the eighth embodiment described above are obtained, and a reduced number of pins (number of terminals) used for input and output or the like of the transmission unit 91 and the reception unit 93 can be implemented.

Tenth Embodiment

Figure 19:
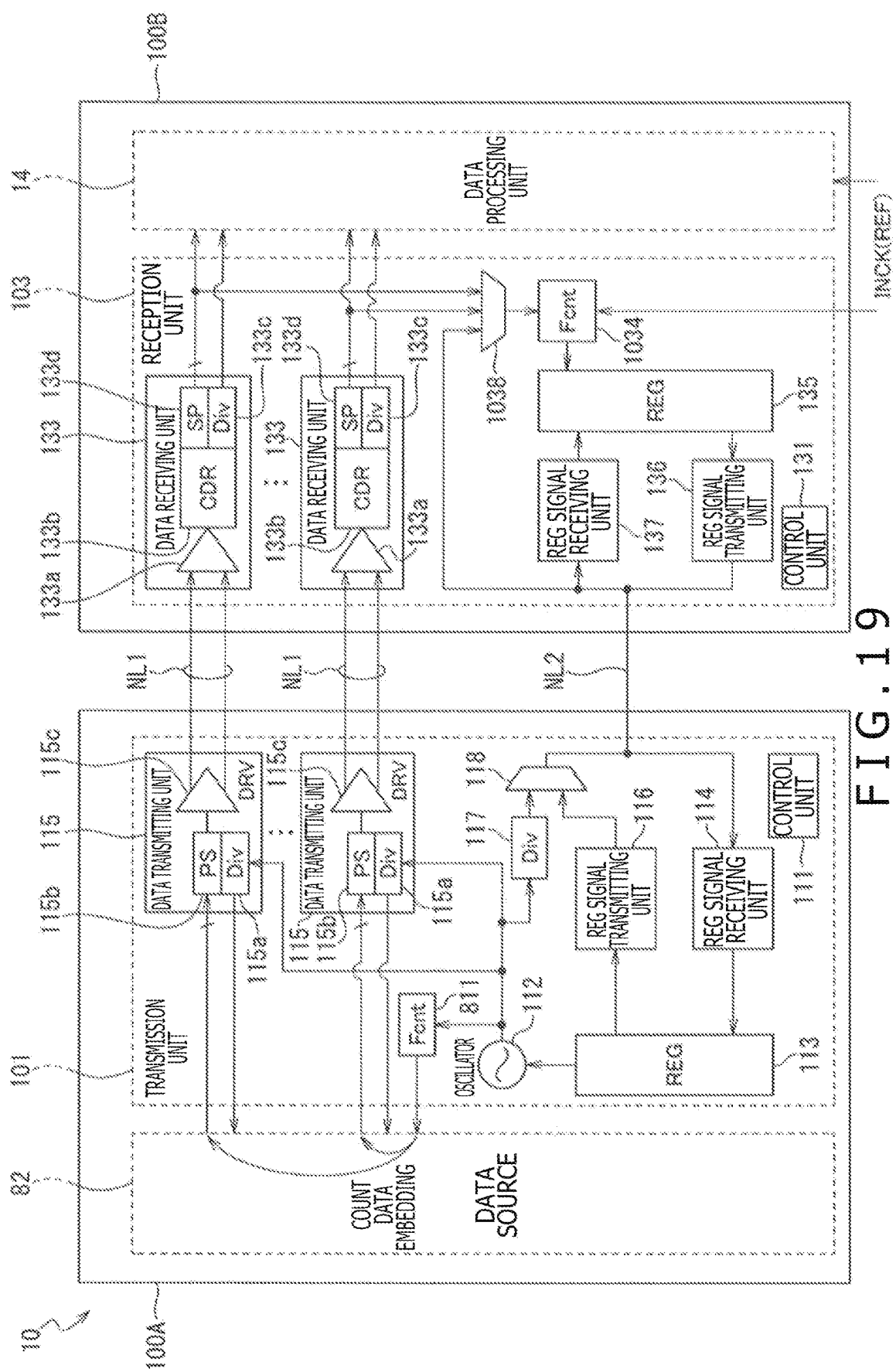
FIG. 19 is a functional block diagram illustrating schematic configurations of a sensor device, a reception device, and a transmission/reception system according to a tenth embodiment of the present technology.

A sensor device, a reception device, and a transmission/reception system according to a tenth embodiment of the present technology are described by using FIG. 19. Note that components having the same actions and functions as the sensor device, the reception device, and the transmission/reception system according to the eighth embodiment described above are denoted by the same reference signs to omit the description.

In the sensor device, the reception device, and the transmission/reception system according to the tenth embodiment, multiple data transmitting units and multiple data receiving units are included.

As illustrated in FIG. 19, a transmission/reception system 10 according to the tenth embodiment includes a sensor device 100A configured to transmit a predetermined signal and a reception device 100B configured to receive a predetermined signal transmitted from the sensor device 100A.

A transmission unit 101 included in the sensor device 100A includes multiple (two illustrated in FIG. 19) data transmitting units 115. The multiple data transmitting units 115 are each the same in configuration and function as the data transmitting unit 115 of the first embodiment described above.

A reception unit 103 included in the reception device 100B includes multiple (two illustrated in FIG. 19) data receiving units 133. The multiple data receiving units 133 are each the same in configuration and function as the data receiving unit 133 of the first embodiment described above. The number of the data receiving units 133 provided in the reception unit 103 is the same as the number of the data transmitting units 115 provided in the transmission unit 101. The data transmitting units 115 and the data receiving units 133 are connected to each other in a one-to-one relation.

In the sensor device 100A, the data source 82 may embed a count value output from the counter 811 in the imaging data Dp of a certain lane including the data transmitting unit 115 and the data receiving unit 133, or in the imaging data Dp of multiple lanes by assuming the failure of data reception in a certain lane.

A signal generating unit 1034 included in the reception unit 103 receives the imaging data Dp output from each of the multiple data receiving units 133 through a switch 1038. Further, the signal generating unit 1034 compares all count values included in the imaging data Dp input from the multiple data receiving units 133 with a count value corresponding to the reference clock signal INCK. Note that the signal generating unit 1034 may compare any of the count values of the multiple lanes with the count value corresponding to the reference clock signal INCK.

Actions and Effects According to Tenth Embodiment

According to the tenth embodiment described above, actions and effects similar to those of the third and eighth embodiments described above are obtained.

Note that the driver 115c of each of the multiple data transmitting units 115 may output, for example, the single-end imaging data Ds input from the parallel-to-serial conversion unit 115b in synchronization with the first clock signal CLK1, as single-end imaging data.

Eleventh Embodiment

Figure 20:
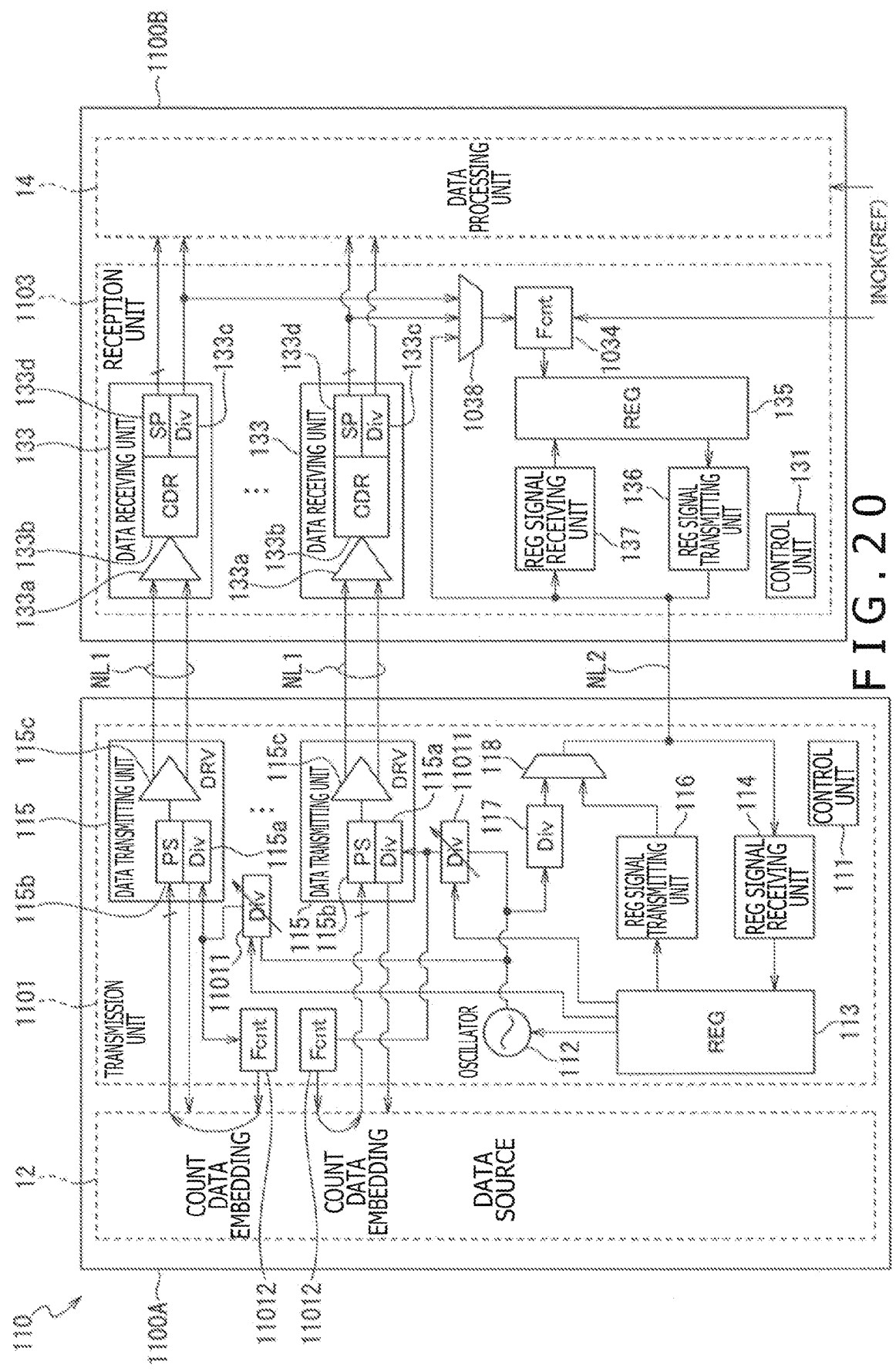
FIG. 20 is a functional block diagram illustrating schematic configurations of a sensor device, a reception device, and a transmission/reception system according to an eleventh embodiment of the present technology.

A sensor device, a reception device, and a transmission/reception system according to an eleventh embodiment of the present technology are described by using FIG. 20. Note that components having the same actions and functions as the sensor device, the reception device, and the transmission/reception system according to the tenth embodiment described above are denoted by the same reference signs to omit the description.

In the sensor device, the reception device, and the transmission/reception system according to the eleventh embodiment, multiple data transmitting units, multiple data receiving units, frequency-variable frequency dividers for the respective data transmitting units, and counters configured to operate with the first clock signal CLK1 are included.

As illustrated in FIG. 20, a transmission/reception system 110 according to the eleventh embodiment includes a sensor device 1100A configured to transmit a predetermined signal and a reception device 1100B configured to receive a predetermined signal transmitted from the sensor device 1100A.

A transmission unit 1101 included in the sensor device 1100A includes multiple (two illustrated in FIG. 20) data transmitting units 115. The multiple data transmitting units 115 are each the same in configuration and function as the data transmitting unit 115 of the first embodiment described above. Further, the multiple data transmitting units 115 are each provided with a frequency-variable frequency divider 11011. The first clock signal CLK1 output from the oscillator 112 is changed in frequency by the frequency divider 11011 and then input to the frequency divider 115a of the data transmitting unit 115 and a counter 11012. A frequency setting value to be set to the frequency divider 11011 is stored in the register 113. Then, an optimum frequency setting value is set to the frequency divider 11011 under the control of the control unit 111.

A reception unit 1103 included in the reception device 1100B includes multiple (two illustrated in FIG. 20) data receiving units 133. The multiple data receiving units 133 are each the same in configuration and function as the data receiving unit 133 of the first embodiment described above. The number of the data receiving units 133 provided in the reception unit 1103 is the same as the number of the data transmitting units 115 provided in the transmission unit 1101. The data transmitting units 115 and the data receiving units 133 are connected to each other in a one-to-one relation.

The signal generating unit 1034 included in the reception unit 1103 receives the imaging data Dp output from the multiple data receiving units 133 through the switch 1038.

Further, the signal generating unit 1034 compares all count values included in the imaging data Dp input from the multiple data receiving units 133 with a count value corresponding to the reference clock signal INCK. Note that the signal generating unit 1034 may compare any of the count values of the multiple lanes with the count value corresponding to the reference clock signal INCK.

In the sensor device 1100A, multiple frequency setting values different from each other in setting content are stored in the register 113 for each lane including the data transmitting unit 115 and the data receiving unit 133. The control unit 111 monitors a load status of each lane. The control unit 111 reads a first frequency setting value for setting a low frequency from the register 113 and sets the first frequency setting value to the frequency divider 11011 with regard to a lane with a large load, and reads a second frequency setting value for setting a high frequency from the register 113 and sets the second frequency setting value to the frequency divider 11011 with regard to a lane with a small load.

Further, for example, the control unit 111 can read a second frequency setting value for setting a high frequency from the register 113 and set the second frequency setting value to the frequency divider 11011 at a temperature of 25° C., and read a first frequency setting value for setting a low frequency from the register 113 and set the first frequency setting value to the frequency divider 11011 at a temperature of 40° C. Note that, as frequency setting value change conditions, for example, processes or power sources can be used other than temperature.

Actions and Effects According to Eleventh Embodiment

According to the eleventh embodiment described above, actions and effects similar to those of the fourth and tenth embodiments described above are obtained, and the frequency of the first clock signal CLK1, which is controlled from the reception device 1100B side, is changed depending on conditions such as processes, power sources, or temperature, thereby allowing the transmission/reception system 110 to efficiently and stably operate.

Further, according to the eleventh embodiment described above, the load status of each lane is monitored, and the data rate of each lane is changed depending on the load status, thereby allowing the transmission/reception system 110 to efficiently operate.

Note that the driver 115c of each of the multiple data transmitting units 115 may output, for example, the single-end imaging data Ds input from the parallel-to-serial conversion unit 115b in synchronization with the first clock signal CLK1, as single-end imaging data.

Other Embodiments

As described above, the present technology has been described with the first to eleventh embodiments, but it is to be understood that the present technology is not limited by the statements and drawings included in the present disclosure. It will be apparent to those skilled in the art that various alternative embodiments, examples, and operational technologies may be included in the present technology, by understanding the gist of the technical contents disclosed in the embodiments described above. Further, the configurations disclosed in the respective first to eleventh embodiments can be appropriately combined with each other as long as no contradiction arises. For example, configurations disclosed in multiple different respective embodiments may be combined with each other, and configurations disclosed in multiple different respective modifications of the same embodiment may be combined with each other.

Note that the present disclosure can also take the following configurations.

(1) A sensor device including:
an oscillator configured to oscillate a first clock signal;
a data transmitting unit configured to transmit imaging data synchronized with the first clock signal to an external device through a first signal transmission path;
a clock signal transmitting unit configured to divide the first clock signal to generate a second clock signal with a lower frequency than the first clock signal and transmit the second clock signal to the external device through a second signal transmission path different from the first signal transmission path; and
a control signal communicating unit configured to communicate a control signal necessary for control of the first clock signal with the external device through the second signal transmission path.

(2) The sensor device according to Item (1), including:
a switching unit configured to output the second clock signal transmitted from the clock signal transmitting unit and the control signal transmitted from the control signal communicating unit, to the external device through the second signal transmission path in a selectively switching manner.

(3) The sensor device according to Item (1),
in which the clock signal transmitting unit transmits the second clock signal to the external device through the second signal transmission path in a period from a boot to a start of transmission of the imaging data to the external device.

(4) The sensor device according to Item (1),
in which the data transmitting unit includes
a frequency divider configured to divide the first clock signal input from the oscillator, to generate the second clock signal,
a parallel-to-serial conversion unit configured to convert parallel-format imaging data input in synchronization with the second clock signal to serial-format imaging data synchronized with the first clock signal, and
a transmission drive unit configured to transmit the serial-format imaging data to the external device through the first signal transmission path.

(5) The sensor device according to Item (1),
in which the data transmitting unit transmits a signal obtained by embedding the first clock signal in the imaging data to the external device through the first signal transmission path.

(6) The sensor device according to Item (5), including:
a counter configured to operate with the first clock signal,
in which the data transmitting unit transmits a signal obtained by embedding a count value obtained by counting by the counter in a predetermined period of time in the imaging data to the external device through the first signal transmission path.

(7) The sensor device according to any one of Items (1) to (6),
in which the data transmitting unit provided is more than one.

(8) A reception device including:
a data receiving unit configured to receive imaging data transmitted from an external device through a first signal transmission path in synchronization with a first clock signal;

a signal generating unit configured to generate a control signal necessary for control of the first clock signal, on the basis of a comparison result of a comparison between a reference clock signal and any one of the first clock signal, a second clock signal based on the first clock signal, and the second clock signal transmitted from the external device through a second signal transmission path; and a control signal communicating unit configured to communicate the control signal generated by the signal generating unit with the external device through the second signal transmission path.

(9) The reception device according to Item (8), in which the data receiving unit includes a frequency divider configured to divide a frequency of the first clock signal input from the external device, to generate the second clock signal, and a serial-to-parallel conversion unit configured to convert serial-format data input from the external device through the first signal transmission path in synchronization with the first clock signal to parallel-format data synchronized with the second clock signal.

(10) The reception device according to Item (8), in which the data receiving unit includes a reproduction unit configured to reproduce, from the imaging data, the first clock signal embedded in the imaging data to be transmitted from the external device through the first signal transmission path.

(11) The reception device according to Item (8), including:

a counter configured to operate with the reference clock signal, in which the signal generating unit generates the control signal on the basis of a comparison result of a comparison between a count value obtained by counting by the counter in a predetermined period of time and a count value sent from the external device and corresponding to the first clock signal.

(12) The reception device according to any one of Items (8) to (11), in which the data receiving unit provided is more than one.

(13) A transmission/reception system including:

a sensor device including an oscillator configured to oscillate a first clock signal, and a data transmitting unit configured to transmit imaging data synchronized with the first clock signal;

a reception device including a data receiving unit configured to receive the imaging data transmitted from the sensor device;

a first signal transmission path connected between the sensor device and the reception device and configured to transmit the imaging data; and a second signal transmission path connected between the sensor device and the reception device and configured to transmit a signal other than the imaging data, in which the sensor device includes a clock signal transmitting unit configured to divide the first clock signal to generate a second clock signal with a lower frequency than the first clock signal and transmit the second clock signal to the reception device through the second signal transmission path, and a sensor-side control signal communicating unit configured to communicate a control signal necessary for control of the first clock signal with the reception device through the second signal transmission path, and the reception device includes a signal generating unit configured to generate the control signal on the basis of a comparison result of a comparison between a reference clock signal and one of the second clock signal transmitted from the sensor device and the second clock signal based on the first clock signal, and a receiver-side control signal transmitting unit configured to communicate the control signal generated by the signal generating unit with the sensor device through the second signal transmission path.

(14) The transmission/reception system according to Item (13), in which the sensor device includes a switching unit configured to output the second clock signal transmitted from the clock signal transmitting unit and the control signal transmitted from the sensor-side control signal communicating unit, to the reception device through the second signal transmission path in a selectively switching manner.

(15) The transmission/reception system according to Item (13) or (14), in which the clock signal transmitting unit transmits the second clock signal to the reception device through the second signal transmission path in a period from a boot to a start of transmission of the imaging data to the reception device.

(16) The transmission/reception system according to Item (13), in which the data transmitting unit includes a first frequency divider configured to divide the first clock signal input from the oscillator, to generate the second clock signal with the lower frequency than the first clock signal, a parallel-to-serial conversion unit configured to convert parallel-format imaging data input in synchronization with the second clock signal to serial-format imaging data synchronized with the first clock signal, and a transmission drive unit configured to transmit the serial-format imaging data to the reception device through the first signal transmission path, and the data receiving unit includes a second frequency divider configured to divide a frequency of the first clock signal transmitted from the sensor device, to generate the second clock signal, and a serial-to-parallel conversion unit configured to convert serial-format data input from the sensor device through the first signal transmission path in synchronization with the first clock signal to parallel-format data synchronized with the second clock signal.

(17) The transmission/reception system according to Item (13), in which the data transmitting unit transmits a signal obtained by embedding the first clock signal in the imaging data to the reception device through the first signal transmission path, and the data receiving unit includes a reproduction unit configured to reproduce, from the imaging data, the first clock signal embedded in the imaging data to be transmitted from the sensor device through the first signal transmission path.

(18) The transmission/reception system according to Item (13),
in which the sensor device includes a first counter configured to operate with the first clock signal,
the data transmitting unit transmits a signal obtained by embedding a count value obtained by counting by the first counter in a predetermined period of time in the imaging data to the reception device through the first signal transmission path,
the reception device includes a second counter configured to operate with the reference clock signal, and
the signal generating unit generates the control signal on the basis of a comparison result of a comparison between a count value obtained by counting by the second counter in a predetermined period of time and a count value sent from the sensor device and obtained by counting by the first counter.

(19) The transmission/reception system according to Item (13),
in which the data transmitting unit provided is more than one, and
the data receiving unit provided is more than one.

(20) The transmission/reception system according to Item (19),
in which the more than one data transmitting unit is allowed to change a frequency of the first clock signal depending on a condition determined in advance.

REFERENCE SIGNS LIST 1, 2, 3, 4, 5, 6, 7, 8, 9, 10, 110, 2000: Transmission/reception system
10A, 20A, 30A, 40A, 50A, 60A, 70A, 80A, 90A, 100A, 1100A, 2010A: Sensor device
10B, 20B, 30B, 40B, 50B, 60B, 70B, 80B, 90B, 100B, 1100B, 2010B: Reception device
11, 31, 41, 61, 71, 81, 91, 101, 1101, 2011: Transmission unit
12, 82: Data source
13, 33, 43, 63, 73, 83, 93, 103, 1103, 2212: Reception unit
14: Data processing unit
115, 215, 615, 915: Data transmitting unit
111, 131: Control unit
112: Oscillator
113, 135: Register
114, 137: Register signal receiving unit
115a, 117, 133c, 215a, 233c, 411, 615a, 633c, 915a, 933c, 11011: Frequency divider
115b, 215b, 615b, 915b: Parallel-to-serial conversion unit
115c, 133a, 215c, 233a, 615c, 633a, 915c, 933a: Driver
116, 136: Register signal transmitting unit
118, 138, 338, 1038: Switch
133, 233, 633, 933: Data receiving unit
133b, 233b, 633b, 933b: Reproduction unit
133d, 233d, 633d, 933d: Serial-to-parallel conversion unit
134, 334, 531, 834, 1034: Signal generating unit
811, 11012: Counter
2111, 2213: Link unit
2121: PLL Circuit
2211: Equalizer
NL1, NL2: Signal transmission path

The invention claimed is:

1. A sensor device, comprising:
an oscillator configured to oscillate a first clock signal;
a data transmitting unit configured to transmit imaging data synchronized with the first clock signal to an external device through a first signal transmission path;
a clock signal transmitting unit configured to:
divide the first clock signal to generate a second clock signal with a lower frequency than the first clock signal, and
transmit the second clock signal to the external device through a second signal transmission path different from the first signal transmission path; and
a control signal communicating unit configured to communicate a control signal necessary for control of the first clock signal with the external device through the second signal transmission path.

2. The sensor device according to claim 1, comprising:
a switching unit configured to:
output, the transmitted second clock signal transmitted and the communicated control signal to the external device through the second signal transmission path in a selectively switching manner.

3. The sensor device according to claim 1, wherein the clock signal transmitting unit is further configured to transmit the second clock signal to the external device through the second signal transmission path in a period from a boot to a start of transmission of the imaging data to the external device.

4. The sensor device according to claim 1, wherein the data transmitting unit includes:
a frequency divider configured to divide the first clock signal input from the oscillator, to generate the second clock signal,
a parallel-to-serial conversion unit configured to convert parallel-format imaging data input in synchronization with the second clock signal to serial-format imaging data synchronized with the first clock signal, and
a transmission drive unit configured to transmit the serial-format imaging data to the external device through the first signal transmission path.

5. The sensor device according to claim 1, wherein the data transmitting unit is further configured transmit a signal obtained by embedding the first clock signal in the imaging data to the external device through the first signal transmission path.

6. The sensor device according to claim 5, comprising:
a counter configured to operate with the first clock signal, wherein the data transmitting unit is further configured to transmit a signal obtained by embedding a count value obtained by counting by the counter in a specific period of time in the imaging data to the external device through the first signal transmission path.

7. The sensor device according to claim 1, wherein the data transmitting unit is more than one.

8. A reception device, comprising:
a data receiving unit configured to receive imaging data transmitted from an external device through a first signal transmission path in synchronization with a first clock signal;
a signal generating unit configured to generate a control signal necessary for control of the first clock signal, based on of a comparison result of a comparison between a reference clock signal and one of a second clock signal based on the first clock signal or the second clock signal transmitted from the external device through a second signal transmission path; and
a control signal communicating unit configured to communicate the generated control signal with the external device through the second signal transmission path.

9. The reception device according to claim 8, wherein the data receiving unit includes:
- a frequency divider configured to divide a frequency of the first clock signal input from the external device, to generate the second clock signal, and
- a serial-to-parallel conversion unit configured to convert serial-format data input from the external device through the first signal transmission path in synchronization with the first clock signal to parallel-format data synchronized with the second clock signal.

10. The reception device according to claim 8,
wherein the data receiving unit includes a reproduction unit configured to reproduce, from the imaging data, the first clock signal embedded in the imaging data to be transmitted from the external device through the first signal transmission path.

11. The reception device according to claim 8, further comprises:
- a counter configured to operate with the reference clock signal, wherein the signal generating unit is further configured to generate the control signal based on a comparison result of a comparison between a count value obtained by counting by the counter in a specific period of time and a count value sent from the external device and corresponding to the first clock signal.

12. The reception device according to claim 8, wherein the data receiving unit is more than one.

13. A transmission/reception system comprising:
- a sensor device including:
  - an oscillator configured to oscillate a first clock signal, and
  - a data transmitting unit configured to transmit imaging data synchronized with the first clock signal;
- a reception device including a data receiving unit configured to receive the transmitted imaging data;
- a first signal transmission path connected between the sensor device and the reception device and configured to transmit the imaging data; and
- a second signal transmission path connected between the sensor device and the reception device and configured to transmit a signal different from the imaging data,
wherein
  the sensor device includes:
  - a clock signal transmitting unit configured to divide the first clock signal to generate a second clock signal with a lower frequency than the first clock signal and transmit the second clock signal to the reception device through the second signal transmission path, and
  - a sensor-side control signal communicating unit configured to communicate a control signal necessary for control of the first clock signal with the reception device through the second signal transmission path, and
  the reception device includes:
  - a signal generating unit configured to generate the control signal based on a comparison result of a comparison between a reference clock signal and one of the transmitted second clock signal or the second clock signal based on the first clock signal, and
  - a receiver-side control signal transmitting unit configured to communicate the generated control signal with the sensor device through the second signal transmission path.

14. The transmission/reception system according to claim 13, wherein the sensor device includes a switching unit configured to output, the transmitted second clock signal and the communicated control signal, to the reception device through the second signal transmission path in a selectively switching manner.

15. The transmission/reception system according to claim 13, wherein the clock signal transmitting unit is further configured to transmit the second clock signal to the reception device through the second signal transmission path in a period from a boot to a start of transmission of the imaging data to the reception device.

16. The transmission/reception system according to claim 13,
wherein the data transmitting unit includes:
- a first frequency divider configured to divide the first clock signal input from the oscillator, to generate the second clock signal with the lower frequency than the first clock signal,
- a parallel-to-serial conversion unit configured to convert parallel-format imaging data input in synchronization with the second clock signal to serial-format imaging data synchronized with the first clock signal, and
- a transmission drive unit configured to transmit the serial-format imaging data to the reception device through the first signal transmission path, and
the data receiving unit includes:
- a second frequency divider configured to divide a frequency of the first clock signal transmitted from the sensor device, to generate the second clock signal, and
- a serial-to-parallel conversion unit configured to convert serial-format data input from the sensor device through the first signal transmission path in synchronization with the first clock signal to parallel-format data synchronized with the second clock signal.

17. The transmission/reception system according to claim 13,
wherein the data transmitting unit is further configured to transmit a signal obtained by embedding the first clock signal in the imaging data to the reception device through the first signal transmission path, and
the data receiving unit includes a reproduction unit configured to reproduce, from the imaging data, the first clock signal embedded in the imaging data to be transmitted from the sensor device through the first signal transmission path.

18. The transmission/reception system according to claim 13,
wherein the sensor device includes a first counter configured to operate with the first clock signal,
the data transmitting unit is further configured to transmit a signal obtained by embedding a count value obtained by counting by the first counter in a predetermined period of time in the imaging data to the reception device through the first signal transmission path,
the reception device includes a second counter configured to operate with the reference clock signal, and
the signal generating unit is further configured to generate the control signal based on a comparison result of a comparison between a count value obtained by counting by the second counter in a specific period of time and a count value sent from the sensor device and obtained by counting by the first counter.

19. The transmission/reception system according to claim 13,
wherein the data transmitting unit is more than one, and the data receiving unit is more than one.

20. The transmission/reception system according to claim 19, wherein the more than one data transmitting unit is further configured change a frequency of the first clock signal based on a specific condition.

* * * * *